US012369001B2

(12) United States Patent
Nagarajaiah et al.

(10) Patent No.: US 12,369,001 B2
(45) Date of Patent: Jul. 22, 2025

(54) MULTI-SERVICE DATA COMMUNICATION BETWEEN A HEARING DEVICE AND AN ACCESSORY

(71) Applicant: Advanced Bionics LLC, Valencia, CA (US)

(72) Inventors: Yadunandan Nagarajaiah, Valencia, CA (US); Diane H. Chang, Arcadia, CA (US)

(73) Assignee: Advanced Bionics LLC, Valencia, CA (US)

( * ) Notice: Subject to any disclaimer, the term of this patent is extended or adjusted under 35 U.S.C. 154(b) by 315 days.

(21) Appl. No.: 18/128,137

(22) Filed: Mar. 29, 2023

(65) Prior Publication Data

US 2024/0334139 A1 Oct. 3, 2024

(51) Int. Cl.
*H04R 25/00* (2006.01)

(52) U.S. Cl.
CPC ......... *H04R 25/554* (2013.01); *H04R 25/606* (2013.01)

(58) Field of Classification Search
CPC . H04R 25/554; H04R 25/606; H04R 2225/55
See application file for complete search history.

(56) References Cited

U.S. PATENT DOCUMENTS 7,292,876 B2 11/2007 Bosch et al.
7,529,565 B2 5/2009 Hilpisch et al.
7,738,913 B2 6/2010 Hilpisch et al.
7,814,218 B1 10/2010 Knee et al.
8,169,938 B2 * 5/2012 Duchscher ........... H04L 65/613 381/23.1
8,175,306 B2 5/2012 Meskens et al.
9,710,419 B2 7/2017 Hug et al.
RE48,039 E 6/2020 Swanson
2021/0281959 A1 9/2021 Hofer et al.

FOREIGN PATENT DOCUMENTS

EP 1322217 B1 11/2005

* cited by examiner

*Primary Examiner* — Brian Ensey
(74) *Attorney, Agent, or Firm* — ALG Intellectual Property, LLC

(57) ABSTRACT

Illustrative communication interfaces and protocols for multi-service data communication between a hearing device and an accessory are described herein. For example, an example hearing system may include a hearing device configured to be worn by a recipient, an accessory configured to interoperate with the hearing device while worn separately by the recipient, and a communication interface between the hearing device and the accessory. The communication interface may include two physical conductors configured to carry differential signaling generated in accordance with a frame protocol that defines a data frame configured to communicate a first dataset and a second dataset. The first dataset is associated with a first data service performed in accordance with a first quality-of-service. The second dataset is associated with a second data service performed in accordance with a second quality-of-service different from and incompatible with the first quality-of-service. Corresponding systems and methods are also disclosed.

20 Claims, 11 Drawing Sheets

MULTI-SERVICE DATA COMMUNICATION BETWEEN A HEARING DEVICE AND AN ACCESSORY

BACKGROUND INFORMATION

Various people suffer from partial or total hearing loss for a variety reasons. For example, certain people are born without any ability to hear or lose this ability as a result of illness or accident. Others may enjoy normal hearing throughout their lives but still find that their hearing ability degrades significantly in their later years. In many of these circumstances, hearing devices may be employed to augment the natural hearing ability of certain hearing device recipients and/or to provide a sense of hearing to other recipients who lack this ability naturally.

Certain hearing devices may be included in systems with multiple components (e.g., components including the hearing device itself, as well as one or more accessories such as other devices, sensors, microphones, implants, etc.) that are configured to interoperate with one another. In cases where multiple components of a hearing system are all worn by the recipient (e.g., on different parts of the head or body) and require intercommunication between the components, communication interfaces and protocols must be selected to satisfy various criteria for the hearing system. Unfortunately, existing communication interfaces and protocols used for legacy hearing systems and/or other types of electronics fail to satisfy certain criteria desirable for modern hearing systems.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
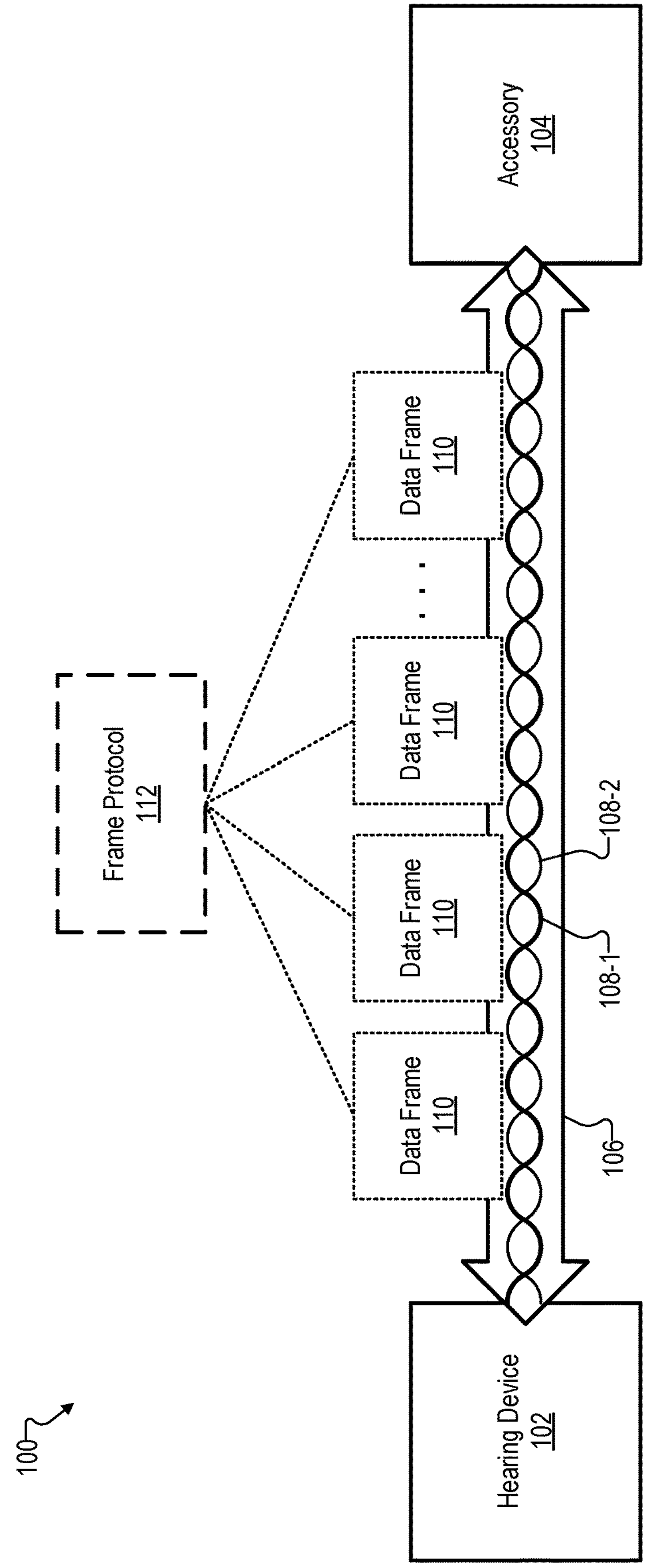
FIG. 1 shows an illustrative hearing system including a hearing device, an accessory, and a communication interface between them.

Systems, methods, and communication interfaces for multi-service data communication between a hearing device and an accessory are described herein. As described above, communication between components of a hearing system (e.g., between a hearing device and an accessory communicatively coupled to that hearing device) may be necessary for proper functionality of the hearing system, yet conventional communication interfaces and protocols may fail to provide desirable and/or optimal features for such communication. For example, desirable communication features for certain hearing systems could include, for example, support for different qualities-of-service within a single data frame (e.g., incompatible qualities-of-service such as a real-time quality-of-service and a control quality-of-service), reliable and resilient communication over a minimal number of wires (e.g., two wires), high-speed communication (e.g., 10 Mbps) over a relatively long distance (e.g., spanning the recipient's body), bidirectional communication (e.g., including communication traveling in different and reconfigurable directions even within a single data frame), low power (e.g., to facilitate long battery life and low heat for body-worn devices), low emissions (e.g., to avoid interference and for safety and regulatory purposes), flexible and reconfigurable data fields, and so forth.

As a first hearing system example for which these types features may be desirable, a modern cochlear implant system will be considered. Conventional cochlear implant systems have typically included a sound processor that provided power and data to a cochlear implant within a recipient by way of radio frequency (RF) signals transmitted by a headpiece. The headpiece would typically be positioned on the recipient's head over a site of the cochlear implant and would be inductively coupled to the cochlear implant such that an RF power signal modulated with data could be generated by the sound processor and inductively provided to the cochlear implant by way of the passive headpiece to thereby supply power and instruction (e.g., stimulation parameters, etc.) to the cochlear implant. While this type of configuration has benefited cochlear implant recipients for many years, there are certain limitations to this paradigm in which the sound processor generates the RF signal (e.g., from behind the ear or wherever else on the body that sound processor is worn) and it is conducted to the cochlear implant by way of the passive headpiece. First, a cable carrying the RF signal between the sound processor and the passive headpiece may be a significant source of undesirable emissions and/or power loss-a problem that may be exacerbated the longer the cable is. Second, the sound processor must be configured to generate a signal that the cochlear implant is configured to receive. Even if a sound processor could be replaced relatively easily, recipients cannot so easily change out devices that are implanted within their bodies. Accordingly, the upgrades that can be made to new generations of sound processors (e.g., to reflect advances in electronics, etc.) may be limited by older generations of cochlear implants that have been implanted in recipients years before.

Some of these challenges may be addressed by a paradigm in which active headpieces, rather than sound processors, are configured to generate RF signals that power and instruct cochlear implants within recipients. For example, older generations of cochlear implants that have been deployed to recipients for many years (e.g., cochlear implants requiring certain RF frequencies, data rates, tolerances, etc.) can be served by active headpieces configured to meet the specifications of those cochlear implants, while newer generations of cochlear implants that have been and/or are still being developed (e.g., cochlear implants configured to use different RF frequencies and/or modulation schemes, different data rates and/or data encoding schemes, different tolerances, different channel allocation or resource sharing schemes, etc., than the older generations) may be served by active headpieces that are configured to satisfy these newer specifications. In this paradigm, sound processors merely send digital data (e.g., rather than modulated RF power signals meeting the requirements of the particular cochlear implant) to the active headpieces, and the active headpieces may then handle all of the implant-specific parameters (e.g., parameters that may exist for many years while recipients in the field are still using older generations of implants). This frees up sound processors to be freely innovated to take advantage of advances in technology (e.g., miniaturization of electronics, changes in regulatory standards and best practices, more powerful and efficient integrated circuits, etc.) that tend to occur at a much faster pace than may be reasonable for implanted electronics such as cochlear implants.

One tradeoff for the various benefits of decoupling sound processors from legacy implants in this way is that specific communication features between sound processors and active headpieces may be desirable that existing communication protocols and technologies are not able to provide. For example, as mentioned above, it may be desirable for communications between a sound processor and an active headpiece to have support for different qualities-of-service within each data frame that is communicated. This is because some types of data being communicated may require a real-time quality-of-service in which increases in latency (e.g., added latency caused by retransmission when data errors are detected, etc.) are not as tolerable as occasional errors, while other types of data being communicated may require a control quality-of-service in which data errors are not tolerable, even if data retransmission (and the resultant increases in latency) are occasionally required. As another example, it may be desirable for reliable and resilient communication between the sound processor and the active headpiece to take place over a minimal number of wires (e.g., ideally over two wires since ground and power may also be carried over a separate pair of wires and every additional wire adds weight, thickness, stiffness, etc., to a cable that recipients must wear and deal with every day, along with increasing the size of the connectors used to attach the cable on each end), and for these few wires to allow for relatively high-speed communication over a relatively long distance (e.g., long enough to extend from a body-worn sound processor to an active headpiece). Moreover, as yet another feature for a communication interface between a sound processor and an active headpiece, bidirectional (and reconfigurably-bidirectional) communication over the same (minimal number of) wires may be desirable to allow various different services to be performed that require information to go in both directions to and from the sound processor. Low power (e.g., to facilitate long battery life and low heat for devices worn on the head or body), light weight, low emissions (e.g., to avoid interference and for safety and regulatory purposes), and other such features may also be desirable for an optimal communication interface between components of these types of cochlear implant systems featuring sound processors that provide digital data (rather than RF power) to active headpieces.

Another hearing system example for which these types features may be desirable is a hearing aid system. Rather than communicating between a sound processor and an active headpiece (as described above), a hearing aid may make use of a communication interface with some or all of the above features to optimally communicate to an accessory such as an audio source (e.g., a microphone system, etc.), an audio sink (e.g., a loudspeaker of a receiver device in the recipient's ear canal), a sensor that is worn elsewhere on the body (e.g., to monitor the recipient's body temperature, heart rate, movement, blood volume, blood-oxygen level, etc.), or another suitable accessory that may augment the function of the hearing aid by communicating with the hearing aid using the types of features that have been described. Other hearing devices (besides cochlear implant system sound processors and/or hearing aids) may also make use of multi-service data communication interface and protocols described herein in any manner as may serve a particular implementation.

While a large number and variety of digital communication protocols exist, all the existing protocols are deficient in at least certain regards with respect to the set of desirable communication features laid out above. For example, protocols designed to provide inter-chip communication (e.g., $I^2C$, $I^2S$, SPI, etc.) are configured only for very short distances (e.g., a few centimeters between chips on a single PCB) and only support single qualities-of-service rather than each of the qualities-of-service desired for hearing systems described herein (e.g., $I^2C$ does not support a real-time quality-of-service, $I^2S$ does not support a control quality-of-service, etc.). Additionally, some of these protocols (e.g., SPI) require more than two wires in order to implement bidirectional communications. Other known protocols that are configured to operate over longer distances (e.g., HDMI, USB, S/PDIF etc.) are also non-optimal for the hearing system objectives described above as these protocols tend to use more than two conductors (e.g., different twisted pairs dedicated to different transmission directions), require relatively large amounts of power, and are otherwise overly complex and unsuited for the types of hearing system communication features described above. Even previous communication interfaces disclosed for hearing systems that have some or all of the same objectives and features described above have required more than two wires for bidirectional communication and have lacked some of the multi-service robustness and resiliency benefits offered by communication interfaces described herein.

Accordingly, systems, methods, and interfaces described herein for multi-service data communication between a hearing device and an accessory are configured to achieve and optimize all of these objectives without the types of compromises required by existing protocols. Specifically, as will be described in more detail below, hearing systems (and associated methods) may employ a communication interface (e.g., between any of the hearing devices and accessories described herein to be worn by a recipient at separate locations on the recipient) that includes two physical conductors configured to carry differential signaling generated in accordance with a frame protocol. The frame protocol may define a data frame configured to communicate various datasets associated with different services and/or corresponding qualities-of-service (including bidirectional services, multiple services per frame, etc.). For example, the frame protocol may define the data frame to communicate a first dataset and a second dataset, where the first dataset is associated with a first data service performed in accordance with a first quality-of-service and the second dataset is associated with a second data service performed in accordance with a second quality-of-service.

These first and second qualities-of-service may be different from one another and, in certain examples, may also be incompatible with one another. As used herein, two qualities-of-service could be different from one another but still be "compatible" in the sense that it would be possible for one quality-of-service to satisfy all the relevant characteristics of the other. For example, if two qualities-of-service are each designed for real-time communications but have different latency tolerances, these qualities-of-services may be considered to be compatible since providing the more restrictive latency tolerance would also provide the less restrictive latency tolerance. As another example, if two qualities-of-service are each designed for error-free data transmission but use different error-detecting codes (e.g., cyclic redundancy checks (CRCs) relying on differing numbers of bits), these qualities-of-service may be considered to be compatible since using the more restrictive CRC error detection would also satisfy the requirements associated with the less restrictive CRC error detection. On the other hand, different qualities-of-service would be considered to be "incompatible," as that term is used herein, if there is an inherent tradeoff between the characteristics provided by the different qualities-of-service. For example, as will be described in more detail below, a first quality-of-service that is used for a real-time service and that optimizes latency at the expense of error-correction (e.g., by overlooking data errors and avoiding data retransmission) may be considered incompatible with a second quality-of-service that is used for a control service and that optimizes data integrity at the expense of latency (e.g. by requiring data retransmission whenever an error is detected).

As will further be illustrated and described, these different services (and different associated qualities-of-service) may also be implemented within a communication interface that is bidirectional (to allow for data flow over the same pair of wires to the accessory from the hearing device or to the hearing device from the accessory), highly configurable (e.g., having different slots in the data frame that can be dynamically reassigned to different services and/or used to transmit data in different directions depending on the present needs of the system, etc.), robust (e.g., tolerant under varying conditions), resilient and reliable (e.g., having very low rates of data errors and being highly capable of recovering data when an error occurs), efficient (e.g., low power, low EMC/EMI emissions), long distance (e.g., to support various locations where recipients may wear the devices), low impact (e.g., allowing small system size, lightweight devices, etc.), flexible (e.g., to support multiple generations, designs, and system paradigms), and/or otherwise optimal for the hearing system objectives and principles described above.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Systems, methods, and interfaces described herein for multi-service data communication between a hearing device and an accessory may provide any of the benefits mentioned above, as well as various additional and/or alternative benefits that will be described and/or made apparent below.

FIG. 1 shows an illustrative hearing system 100 including a hearing device 102, an accessory 104, and a communication interface 106 between hearing device 102 and accessory 104. Hearing device 102 may be configured to be worn by a recipient. For example, as will be described in more detail below, if hearing system 100 is implemented as a cochlear implant system, hearing device 102 could be implemented as a sound processor worn by the recipient behind the ear, on the body (e.g., in a pocket, strapped to the arm, on a belt, etc.), or in another suitable location. Conversely, if hearing system 100 is implemented as a hearing aid system, hearing device 102 could be implemented as a hearing aid worn by the recipient behind the ear, within or just outside the ear canal, or in another suitable location.

Accessory 104 may be configured to interoperate with hearing device 102 while worn by the recipient at a separate location from hearing device 102. For instance, in the cochlear implant system example mentioned above, accessory 104 could be implemented as an active headpiece that attaches to the head at a location where it can be inductively coupled to a cochlear implant implanted within the recipient. In the hearing aid system example, accessory 104 could be implemented as an audio source (e.g., a microphone or the like), an audio sink (e.g., a loudspeaker, etc.), a biometric sensor, or another device that attaches to the recipient's head or body in another location near or away from the hearing aid. In some examples, such audio sources, sinks, and/or sensors could additionally or alternatively serve as accessories for cochlear implant system implementations and/or other types of hearing systems besides hearing aid systems. Specific examples of accessories and how they may interoperate with hearing devices will be described in more detail below.

Communication interface 106 may provide communication exchange between hearing device 102 and accessory 104. As shown, communication interface 106 may include two physical conductors 108 (i.e., conductors 108-1 and 108-2). Conductors 108 may be configured to carry differential signaling generated in accordance with a frame protocol. For instance, as illustrated, conductors 108 may be implemented as a twisted pair of wires that carries differential signaling (e.g., low-voltage differential signal (LVDS) or other suitable differential signaling) across two wires without need for a dedicated ground wire or other conductor (e.g., since each endpoint may be locally powered and an LVDS interface may be AC-coupled). While most examples described herein involve communication interfaces 106 between a hearing device and an accessory at different locations, it will be understood that, in certain embodiments (e.g., a single-unit sound processor that performs roles described herein for both the sound processor and the headpiece), communications described herein may take place between different chips on a shared printed circuit board (PCB) or otherwise within a single device at a single location. In these examples, it will be understood that, rather than a twisted pair of wires as mentioned above, conductors 108 may be implemented as traces on the PCB (e.g., matched to have similar lengths, impedances, etc.) or implemented in another suitable way.

As shown, communication interface 106 may be configured to carry a plurality of data frames 110 that are defined by a frame protocol 112. While frame protocol 112 is not a tangible object like hearing device 102, accessory 104, or the conductors 108 of communication interface 106, frame protocol 112 may set forth rules, specifications, parameters, and so forth that are followed by hearing device 102 and accessory 104 when exchanging information using data frames 110 over communication interface 106. For example, frame protocol 112 may define data frames 110 to each be configured to communicate various datasets associated with various services that are jointly carried out by hearing device 102 and/or accessory 104. A particular data frame 110, for instance, may include a first dataset and a second dataset (as well as various other datasets in certain examples). The first dataset may be associated with a first data service performed in accordance with a first quality-of-service, while the second dataset may be associated with a second data service performed in accordance with a second quality-of-service different from and incompatible with the first quality-of-service. For example, the first dataset may be associated with a real-time data service that requires low latency even at the expense of occasional data errors. The second dataset may then be associated with a control data service that requires flawless data integrity even at the expense of occasional increases in latency (for retransmitting data that was detected to have errors). It will be understood that this first and second dataset are examples only and that more complex data frames (e.g., data frames including more than two datasets, additional services, additional qualities-of-service, etc.) will be described in more detail below.

Hearing system 100 may be used to implement certain methods of multi-service data communication between a hearing device and an accessory. For example, a method in accordance with these principles may include communicating a first dataset and a second dataset between hearing device 102 (worn by the recipient) and accessory 104 (interoperating with hearing device 102 while worn by the recipient at a separate location from hearing device 102), where that communicating of the first and second datasets is performed by way of communication interface 106 between hearing device 102 and accessory 104. In this example method, communication interface 106 may again be understood to include the two physical conductors 108 configured to carry differential signaling generated in accordance with frame protocol 112. Accordingly, as part of a data frame 110 defined by frame protocol 112, the data frame 110 may be defined such that the first dataset is associated with a first data service performed in accordance with a first quality-of-service and the second dataset is associated with a second data service performed in accordance with a second quality-of-service different from and incompatible with the first quality-of-service.

Figure 2:
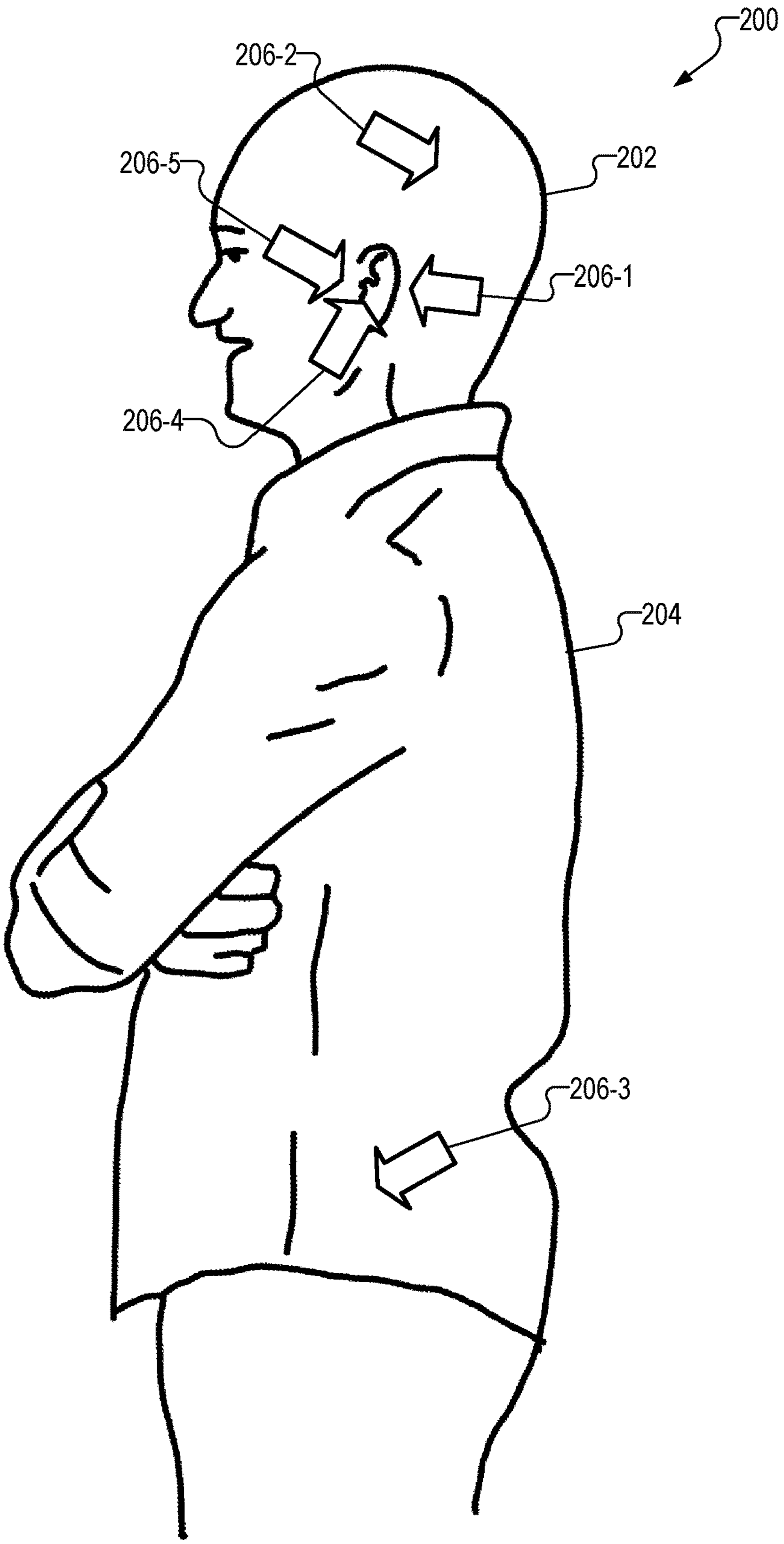
FIG. 2 shows an illustrative hearing system recipient and example locations on the recipient where components of the hearing system of FIG. 1 may be worn.

FIG. 2 shows an illustrative hearing system recipient 200 and example locations on the recipient where components of hearing system 100 (e.g., including hearing device 102 and accessory 104) may be worn. As shown, recipient 200 has a head 202 (shown from a profile view) and a body 204 (shown from approximately the waist up) that may each include one or more locations 206 (e.g., example locations 206-1 through 206-5) where a component of hearing system 100 could be disposed during operation. It will be understood that hearing device 102 and accessory 104 would generally be located at different locations 206, thereby requiring robust and resilient communication between the one location 206 and the other. For example, if hearing device 102 is implemented by a sound processor of a cochlear implant system, the sound processor may be worn at location 206-1 on head 202 behind the recipient's ear (a behind-the-ear (BTE) sound processor) or at location 206-3 on body 204 using the recipient's belt or pocket (a body-worn sound processor). If accessory 104 is implemented by an active headpiece of the cochlear implant system, the active headpiece may magnetically or otherwise attach to head 202, such as at location 206-2 or another suitable location that facilitates inductive coupling with a cochlear implant. Conversely, if hearing device 102 is implemented by a hearing aid of a hearing aid system, the hearing aid may be worn at location 206-4 within the recipient's ear. If accessory 104 is then implemented by a microphone or sensor communicatively coupled to the hearing aid, the microphone or sensor may be located on or near the ear at location 206-5, behind the ear at location 206-1, on the body at a location such as location 206-3, or in another suitable location on the head 202 or body 204 of recipient 200.

In all the example locations 206 shown in FIG. 2 (as well as other locations on the head or body of recipient 200), communication interface 106 may be configured (e.g., based on the way frame protocol 112 define data frames 110, etc.) to reliably and efficiently carry communications between components disposed at those locations. In this way, the objectives and principles described herein for hearing system communications may be satisfied regardless of where recipient 200 happens to wear the components of hearing system 100. For instance, communication interface 106 may be configured to operate at distances as short as 1 mm or less (e.g., much shorter than the typical use case for communication interfaces such as USB and HDMI) and at distances as large as 42-84 inches or longer (e.g., much longer than the typical use case for inter-chip communication interfaces such as $I^2C$, $I^2S$, SPI, etc.). As mentioned above, while most examples illustrated and described herein involve endpoints located at different locations 206, it will be understood that communication interface 106 may also be used in inter-chip communications (e.g., to facilitate communications between chips on a single PCB within a single device such as a single-unit sound processor or the like).

Figure 3:
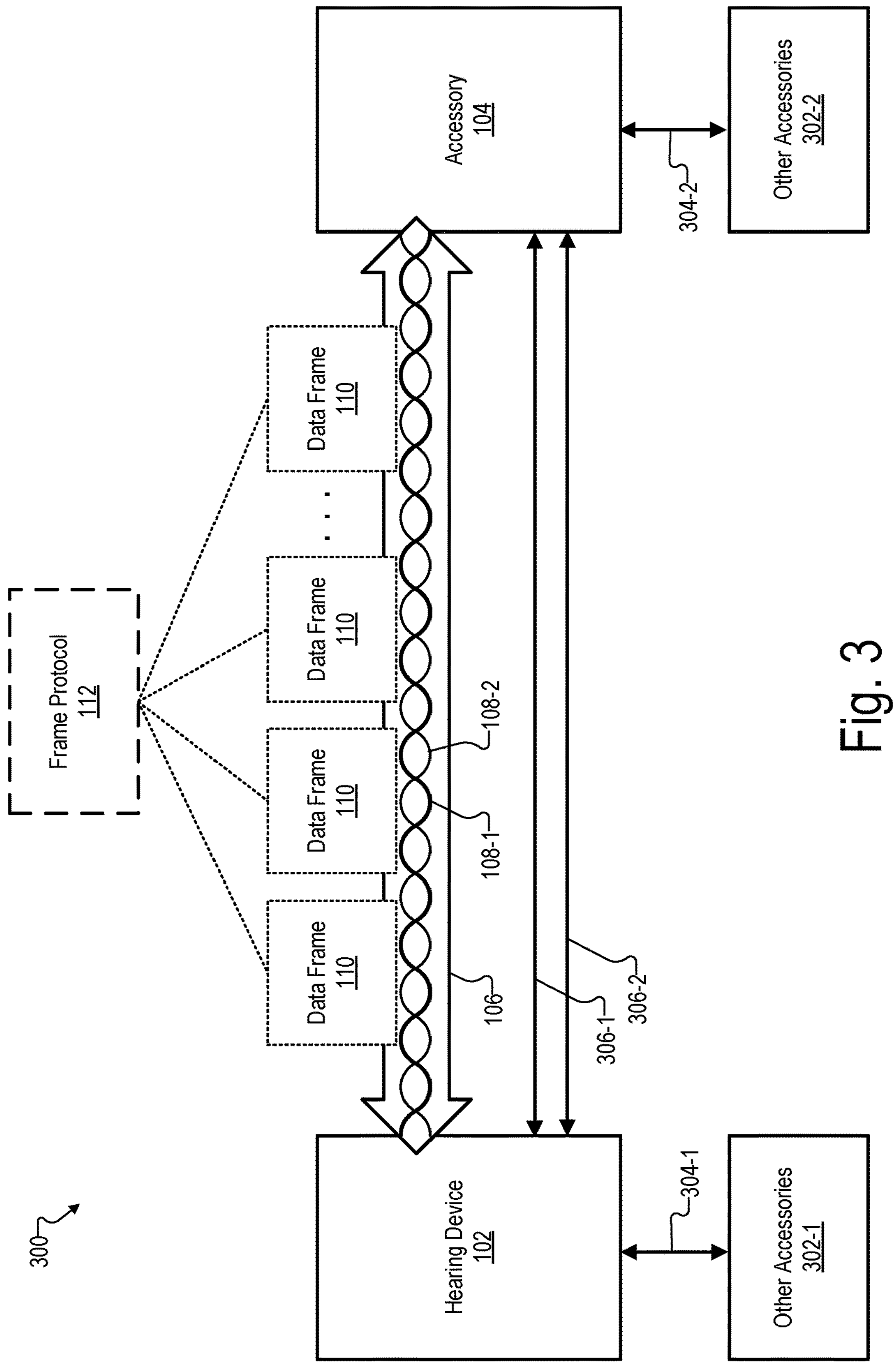
FIG. 3 shows another example embodiment of the hearing system of FIG. 1.
Figure 4:
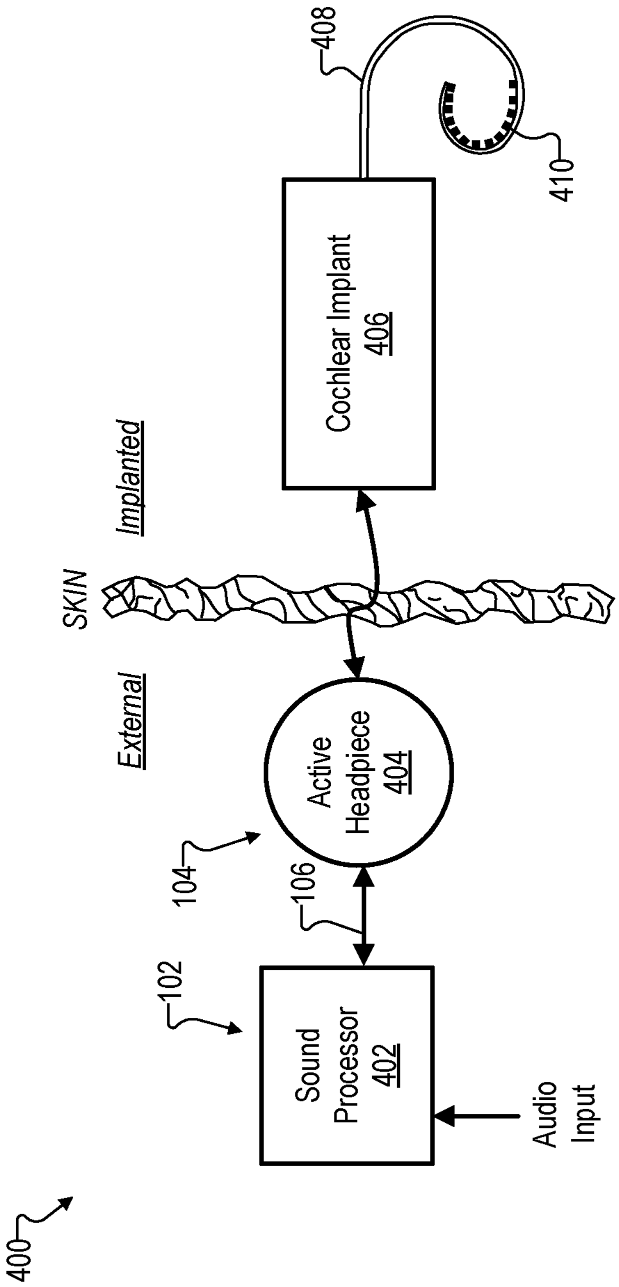
FIG. 4 shows an illustrative cochlear implant system that may implement the hearing system of FIG. 1 in certain embodiments.
Figure 5:
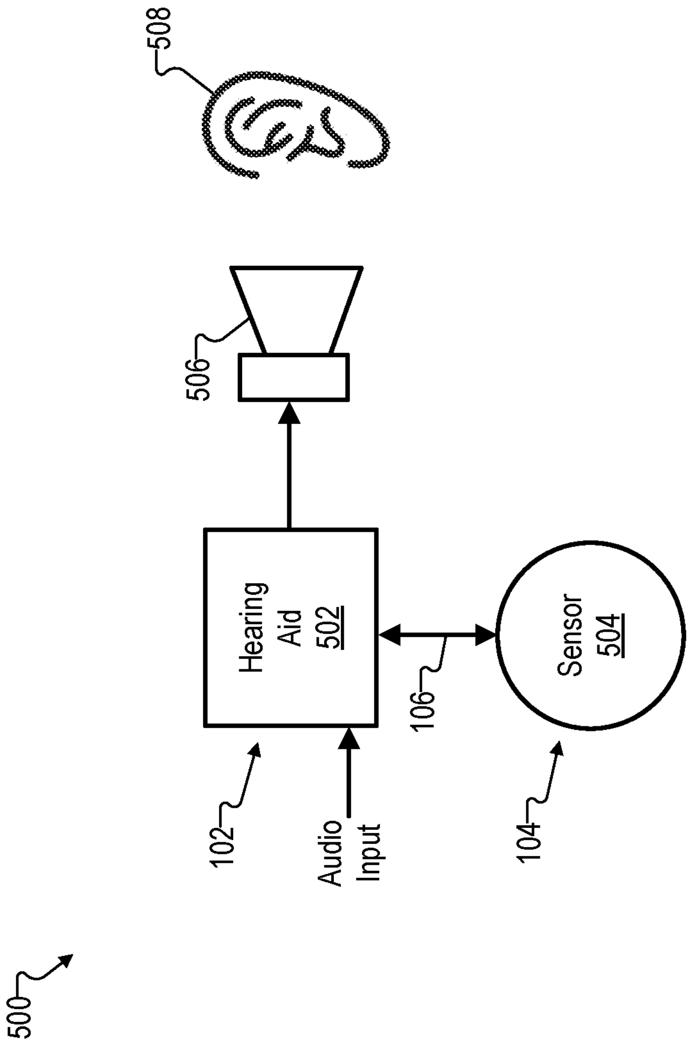
FIG. 5 shows an illustrative hearing aid system that may implement the hearing system of FIG. 1 in certain embodiments.

While FIG. 1 shows certain key features of a relatively generic hearing system 100, it will be understood that implementations of hearing system 100 may include additional components not explicitly shown in FIG. 1 and that generic components of hearing system 100 may be implemented in different ways in different types of implementations. To illustrate, FIG. 3 shows an example embodiment of hearing system 100 that includes additional generic components, FIG. 4 shows an illustrative cochlear implant system that may implement hearing system 100 in one particular embodiment, and FIG. 5 shows an illustrative hearing aid system that may implement hearing system 100 in another particular embodiment. Each of these specific embodiments or implementations of hearing system 100 will now be described in more detail.

In FIG. 3, implementation 300 of hearing system 100 is shown to include the same components described above (e.g., hearing device 102, accessory 104, communication interface 106 with conductors 108, and data frames 110 defined by frame protocol 112), as well as additional components not previously illustrated. Specifically, along with the components of FIG. 1, FIG. 3 further shows that one or more other accessories 302 (e.g., other accessories 302-1 and 302-2) may interoperate with hearing device 102 and/or accessory 104 by being communicatively coupled to these components by way of other interfaces 304 (e.g., interface 304-1 coupling other accessories 302-1 to hearing device 102 and interface 304-2 coupling other accessories 302-2 to accessory 104).

Other accessories 302 and other interfaces 304 by way of which they are coupled to the other components of hearing system 100 may include any suitable accessories or interfaces implemented in any manner as may serve a particular implementation. For example, if implementation 300 of hearing system 100 is a cochlear implant system in which hearing device 102 is implemented by a sound processor and accessory 104 is implemented by an active headpiece, other accessories 302-1 could represent microphones and/or other audio sources, receiver devices (e.g., loudspeakers) or other audio sinks, any of the various sensors (e.g., biometric sensors, etc.) described herein in relation to hearing aid or other hearing system implementations, a battery, a clinician programming device used by a clinician to fit the cochlear implant system to the recipient, a mobile device operated by the recipient and used to control his or her cochlear implant system, or another suitable such device. In these examples, interface 304-1 could represent a communication interface such as a USB interface, a wireless interface (e.g., Bluetooth, Wi-Fi, etc.), a proprietary interface, or another communication interface similar to communication interface 106. In this cochlear implant system example, other accessories 302-2 could represent the cochlear implant that is implanted within the recipient (or any other suitable accessory described herein), while interface 304-2 may represent a wireless inductive interface between the active headpiece implementing accessory 104 and the cochlear implant (or any other suitable communication interface described herein).

If implementation 300 of hearing system 100 is a hearing aid system in which hearing device 102 is implemented by a hearing aid and accessory 104 is implemented by a sensor, other accessories 302-1 could represent microphones and/or other audio sources separate from accessory 104, receiver devices implementing loudspeakers and/or other audio sinks, additional sensors separate from accessory 104, a battery, a fitting device or mobile device similar to those described above, or the like. As such, interface 304-1 may be implemented similarly as described above for the cochlear implant system example. In this hearing aid system example, other accessories 302-2 could also represent things such as batteries relied upon for the sensor or audio interface implementing accessory 104, additional sensors, or other such components linked to accessory 104 by any type of interface 304-2 as may serve a particular implementation.

Also shown in FIG. 3, hearing device 102 and accessory 104 may further be physically coupled (e.g., electrically coupled, communicatively coupled, etc.) by way of one or more additional physical conductors 306 (e.g., two of which, conductors 306-1 and 306-2, are illustrated in FIG. 3). These additional conductors 306 may be used in addition to conductors 108 of communication interface 106 for similar or distinct purposes. For example, while conductors 108 may carry the multi-service, bidirectional data communications described herein (and may be responsible for carrying all data communication between hearing device 102 and accessory 104), one or more additional physical conductors 306 may be configured to carry power (e.g., with a power line and a ground line) in one direction (e.g., from hearing device 102 to accessory 104). For example, accessory 104 may operate using direct current (DC) power provided by hearing device 102 over conductors 306.

It will be understood that grounding of signals transmitted over conductors 108 may be accomplished in various ways. For instance, communication may be accomplished with the twisted pair of differential wires shown (i.e., conductors 108) and no ground connection may be required (or a floating ground may be employed) to ground the differential signaling. In other examples, alternating current (AC) coupling may be used to establish a local DC operating point for the differential signal (e.g., by capacitively coupling the differential signal). In still other configurations, implementations of hearing device 102 and accessory 104 may share earth ground such that a third wire is not needed. In an example such as illustrated by implementation 300 in which four wires (two conductors 108 and two conductors 306) are employed, it will be understood that one conductor 306 (e.g., conductor 306-2) may serve as a dedicated ground conductor, such that both hearing device 102 and accessory 104 may see approximately the same DC operating point for the differential signaling performed on conductors 108. It will also be understood that, in certain examples, other conductors 306 used for other purposes may also be included in an implementation of hearing system 100.

As has been mentioned, one way that hearing system 100 may be implemented is as a cochlear implant system in which hearing device 102 is implemented by a sound processor and in which accessory 104 is implemented by an active headpiece that is communicatively coupled to the sound processor by way of communication interface 106. The active headpiece may also be inductively coupled (e.g., by way of one of other interfaces 304) to a cochlear implant that is implanted within the recipient (implementing one of other accessories 302).

To illustrate, FIG. 4 shows an example cochlear implant system 400 that may implement hearing system 100 in certain embodiments. As shown, cochlear implant system 400 includes a sound processor 402 (implementing hearing device 102), an active headpiece 404 (implementing accessory 104), a communication interface between them (implementing communication interface 106), a cochlear implant 406, and an electrode lead 408 physically coupled to cochlear implant 406 and having an array of electrodes 410.

While the example cochlear implant system 400 shown in FIG. 4 is unilateral (i.e., associated with only one ear of the recipient), it will be understood that a bilateral configuration of cochlear implant system 400 could be implemented that includes separate cochlear implants and electrode leads for each ear of the recipient. In such a bilateral configuration, dual sound processors could be used to implement sound processor 402 or a single processing unit could be configured to interface with both cochlear implants by way of two active headpieces.

Cochlear implant 406 may be implemented by any suitable type of implantable stimulator configured to apply electrical stimulation to one or more stimulation sites located along an auditory pathway of the recipient. In some examples, cochlear implant 406 may additionally or alternatively apply nonelectrical stimulation (e.g., mechanical, acoustic, and/or optical stimulation) to the auditory pathway of the recipient.

In some examples, cochlear implant 406 may be configured to generate electrical stimulation representative of an audio input signal ("Audio Input") processed by sound processor 402 in accordance with one or more stimulation parameters transmitted to cochlear implant 406 by sound processor 402. Cochlear implant 406 may be further configured to apply the electrical stimulation to one or more stimulation sites (e.g., one or more intracochlear locations) within the recipient by way of one or more electrodes 410 on electrode lead 408. In some examples, cochlear implant 406 may include a plurality of independent current sources each associated with a channel defined by one or more of electrodes 410. In this manner, different stimulation current levels may be applied to multiple stimulation sites simultaneously by way of multiple electrodes 410.

Cochlear implant 406 may additionally or alternatively be configured to generate, store, and/or transmit data. For example, cochlear implant 406 may use one or more electrodes 410 to record one or more signals (e.g., one or more voltages, impedances, evoked responses within the recipient, and/or other measurements) and to transmit, by way of communication interface 106, data representative of the one or more signals to sound processor 402 and/or another processing unit associated with sound processor 402 (e.g., a processing unit implementing one of other accessories 302-1). In some examples, this data may be referred to as back telemetry data.

Electrode lead 408 may be implemented in any suitable manner. For example, a distal portion of electrode lead 408 may be pre-curved such that electrode lead 408 conforms with the helical shape of the cochlea after being implanted. Electrode lead 408 may alternatively be naturally straight or of any other suitable configuration.

In some examples, electrode lead 408 may include a plurality of wires (e.g., within an outer sheath) that conductively couple electrodes 410 to one or more current sources within cochlear implant 406. For example, if there are n electrodes 410 on electrode lead 408 and n current sources within cochlear implant 406, there may be n separate wires within electrode lead 408 that are configured to conductively connect each electrode 410 to a different one of the n current sources. Exemplary values for n are 8, 12, 16, or any other suitable number.

Electrodes 410 are located on at least a distal portion of electrode lead 408. In this configuration, after the distal portion of electrode lead 408 is inserted into the cochlea, electrical stimulation may be applied by way of one or more of electrodes 410 to one or more intracochlear locations. One or more other electrodes (e.g., including a ground electrode, not explicitly shown) may also be disposed on other parts of electrode lead 408 (e.g., on a proximal portion of electrode lead 408) to, for example, provide a current return path for stimulation current applied by electrodes 410 and to remain external to the cochlea after the distal portion of electrode lead 408 is inserted into the cochlea. Additionally or alternatively, a housing of cochlear implant 406 may serve as a ground electrode for stimulation current applied by electrodes 410.

Sound processor 402 may be configured to interface with (e.g., control and/or receive data from) cochlear implant 406 by way of communication interface 106 and active headpiece 404. For example, sound processor 402 may transmit commands (e.g., stimulation parameters and/or other types of operating parameters in the form of data words included in a forward telemetry sequence) to cochlear implant 406 by way of communication interface 106 and active headpiece 404 using data communication principles described herein. Sound processor 402 may additionally or alternatively provide operating power to cochlear implant 406 by transmitting one or more power signals to cochlear implant 406 by way of active headpiece 404 (e.g., supplying the power over one or more additional physical conductors such as conductors 306 described above). Sound processor 402 may also receive data from cochlear implant 406 by way of active headpiece 404 and communication interface 106 in any of the ways described herein.

To perform the operations described herein, it will be understood that sound processor 402 may include a memory, a processor, and/or any other computing components as may serve a particular implementation. For example, the memory may be implemented by any suitable non-transitory computer-readable medium and/or non-transitory processor-readable medium, such as any combination of non-volatile storage media and/or volatile storage media. The memory may maintain (e.g., store) executable instructions used by the processor to perform one or more of the operations described herein. Such instructions may be implemented by any suitable application, program (e.g., sound processing program), software, code, and/or other executable data instance. The memory may also maintain any data received, generated, managed, used, and/or transmitted by the processor.

The processor included in sound processor 402 may be configured to perform (e.g., execute instructions stored in the memory to perform) various operations with respect to cochlear implant 406. For example, the processor may receive the "Audio Input" signal (e.g., by way of a microphone communicatively coupled to sound processor 402, a wireless interface (e.g., a Bluetooth interface), a wired interface (e.g., an auxiliary input port), etc.) and may process this audio signal in accordance with a sound processing program stored in the memory to generate appropriate stimulation parameters. The processor may then transmit the stimulation parameters to cochlear implant 406 by way of communication interface 106 and active headpiece 404 to thereby direct cochlear implant 406 to apply electrical stimulation representative of the audio signal to the recipient.

In some implementations, sound processor 402 may also be configured to apply acoustic stimulation to the recipient. For example, a receiver (also referred to as a loudspeaker) may be optionally coupled to sound processor 402. In this configuration, sound processor 402 may deliver acoustic stimulation to the recipient by way of the receiver. The acoustic stimulation may be representative of an audio signal (e.g., an amplified version of the audio signal), configured to elicit an evoked response within the recipient, and/or otherwise configured. In configurations in which sound processor 402 is configured to both deliver acoustic stimulation to the recipient and direct cochlear implant 406 to apply electrical stimulation to the recipient, cochlear implant system 400 may be referred to as a bimodal hearing system and/or any other suitable term. As mentioned above, communication interface 106 may be used in such examples for the sound processor 402 to communicate with devices providing the acoustic stimulation (e.g., microphones, etc.) and/or delivering the acoustic stimulation (e.g., loudspeakers, etc.), as well as to communicate with active headpiece 404.

Sound processor 402 may be additionally or alternatively configured to receive and process data generated by cochlear implant 406. For example, sound processor 402 may receive data representative of a signal recorded by cochlear implant 406 using one or more of electrodes 410 and, based on the data, adjust one or more operating parameters of sound processor 402. Additionally or alternatively, sound processor 402 may use the data to perform one or more diagnostic operations with respect to cochlear implant 406 and/or the recipient.

Other operations may be performed by sound processor 402 as may serve a particular implementation. In the description provided herein, any references to operations performed by sound processor 402 and/or any implementation thereof may be understood to be performed by the processor included therein (e.g., implemented by a central processing unit, a microprocessor, an FPGA, an ASIC, etc.) based on instructions stored in the memory, as described above.

Sound processor 402 may be implemented by any suitable device that may be worn or carried by recipient 200 in any of locations 206 described above. For example, sound processor 402 may be implemented by a behind-the-ear (BTE) unit configured to be worn behind and/or on top of an ear of the recipient (e.g., at location 206-1). Additionally or alternatively, sound processor 402 may be implemented by an off-the-ear unit (also referred to as a body worn device) configured to be worn or carried by the recipient away from the ear (e.g., at location 206-2 or another suitable location).

One or more microphones connected to sound processor 402 may be configured to detect one or more audio signals (e.g., that include speech and/or any other type of sound) in an environment of the recipient and to provide the audio signals to sound processor 402 ("Audio Input"). Such microphones may be implemented in any suitable manner. For example, one microphone may be configured to be placed within the concha of the ear near the entrance to the ear canal, such as a T-MIC™ microphone from Advanced Bionics. Such a microphone may be held within the concha of the ear near the entrance of the ear canal during normal operation by a boom or stalk that is attached to an ear hook configured to be selectively attached to sound processor 402. As another example, one or more other microphones may be implemented in or on active headpiece 404, in or on a housing of sound processor 402, or in other suitable locations. In some examples, microphones may be configured as beam-forming microphones to assist with capturing speech and other sounds coming from particular directions in the recipient's environment.

Active headpiece 404 may be selectively and communicatively coupled to sound processor 402 by way of communication interface 106, which may be implemented in any of the ways described herein. Additionally, as mentioned above, other physical connections between sound processor 402 and active headpiece 404 may provide DC power as may serve a particular implementation. Active headpiece 404 may include an external antenna (e.g., a coil and/or one or more wireless communication components) configured to facilitate selective wireless (e.g., inductive) coupling of active headpiece 404 to cochlear implant 406. In this way, active headpiece 404 may generate and provide wireless power and data to cochlear implant 406 (e.g., by way of a modulated RF power signal inductively transmitted through the skin) and may serve to selectively and wirelessly couple sound processor 402 and/or any other external device to cochlear implant 406. Active headpiece 404 may be configured to be affixed to the recipient's head and positioned such that the external antenna housed within active headpiece 404 is communicatively coupled to a corresponding implantable antenna (which may also be implemented by a coil and/or one or more wireless communication components) included within or otherwise connected to cochlear implant 406. In this manner, stimulation parameters and/or power signals may be transmitted wirelessly and transcutaneously (i.e., through the "SKIN" layer) between active headpiece 404 and cochlear implant 406.

Another way that hearing system 100 may be implemented is as a hearing aid system in which hearing device 102 is implemented by a hearing aid and accessory 104 is implemented by one or more sensors (e.g., including a biometric sensor and/or any other suitable sensor described herein), by one or more audio sources (e.g., including a microphone facing outward to the acoustic environment, a microphone facing inward to the ear drum to support occlusion effect cancellation, etc.), by one or more audio sinks (e.g., a loudspeaker housed in the ear canal to present audio to the recipient, etc.), and/or by any other suitable accessories as may be communicatively coupled to the hearing aid by way of communication interface 106.

To illustrate, FIG. 5 shows an example hearing aid system 500 that may implement hearing system 100 in certain embodiments. As shown, hearing aid system 500 includes a hearing aid 502 that implements hearing device 102, a sensor 504 that implements accessory 104, and an acoustic receiver 506 (e.g., a loudspeaker or other audio sink) configured to present acoustic stimulation to an ear 508 of the recipient.

Hearing aid 502 may play a similar role in hearing aid system 500 as sound processor 402 is described to have in cochlear implant system 400. For example, hearing aid 502 may receive one or more audio signals ("Audio Input") from similar types of sources as described above for sound processor 402 (e.g., from one or more microphones, auxiliary audio sources, etc.) and may use computing components (e.g., a memory, a processor, etc.) to analyze the audio input and generate an output that assists the recipient in hearing the environment around them or the auxiliary audio input that is being presented. However, rather than generating stimulation parameters that are to be converted to electrical stimulation applied directly to the recipient's cochlea (e.g., by way of active headpiece 404 and cochlear implant 406, as described above in relation to cochlear implant system 400), hearing aid 502 may generate acoustic stimulation to be presented by acoustic receiver 506 to thereby improve the hearing of a recipient that retains some ability to hear (but who, for example, struggles to hear certain frequencies of sound that hearing aid 502 may amplify).

The sensor 504 shown in FIG. 5 will be understood to represent one or more sensors (e.g., movement sensors, biometric sensors, noise sensors, etc.) that may be integrated with hearing aid 502 and acoustic receiver 506 within hearing aid system 500. While no auxiliary sensor may necessarily be needed for hearing aid system 500 to achieve its basic function of facilitating hearing, various benefits may be gained by hearing aid system 500 incorporating other types of data into its sound processing programs. As one example, sound processing performed by hearing aid 502 may be based on biometric information captured by the sensors to ensure that the output of acoustic receiver 506 is well-suited to current circumstances that the recipient is facing. Additionally, hearing aid 502 may include features that provide information to the recipient about the biometrics and other information that can be detected to either inform or warn the recipient in any suitable way (e.g., to indicate, on demand, what the recipient's temperature or blood pressure is; to warn the recipient when his or her pulse is too high or too low; etc.).

To this end, sensor 504 may include any type of sensor as may serve a particular implementation. For instance, sensor 504 may include or be implemented by one or more one of an accelerometer, a blood-oxygen level sensor (which may be used in combination with the accelerometer in certain examples to ensure that blood-oxygen is measured when the recipient is not moving), a body temperature sensor, a heart rate (pulse) sensor, a blood pressure sensor, an pulse-oxygen-meter (e.g., to measure blood $O_2$ levels), a blood volume change sensor (e.g., a photoplethysmogram (PPG) sensor), a noise sensor (e.g., to detect if volume levels are dangerously high), and/or other suitable types of biometric or non-biometric sensors. While not explicitly shown in FIG. 4 above, it will also be understood that any of these or other similar types of sensors may be implemented as accessories in cochlear implant system implementations. For example, such sensors may be connected to sound processors by interfaces such as communication interface 106 in addition or as an alternative to active headpiece accessories explicitly described above.

As shown, sensor 504 may implement accessory 104 in this example and, as such, may be configured to communicate with hearing aid 502 (implementing hearing device 102) by way of any of the examples of communication interface 106 described herein (e.g., communicating using data frames 110 that adhere to frame protocol 112, etc.). While the link between hearing aid 502 and sensor 504 is the only link explicitly labeled in FIG. 5 to implement communication interface 106, it will be understood that other communications in hearing aid system 500 (as well as in cochlear implant system 400 described above) may also take place by way of an interface such as communication interface 106, even if not explicitly shown that way. For example, data frames 110 in accordance with frame protocol 112 may be used to transmit audio signals from audio sources (e.g., microphones, etc.) to hearing aid 502, from hearing aid 502 to audio sinks such as acoustic receiver 506, between other accessories and hearing aid 502, or the like.

In some examples, public-private key cryptography techniques or other suitable forms of data encryptions may be employed to encrypt data link content that is transmitted over communication interfaces such as communication interface 106. In this way, an added measure of security can be employed to ensure that information exchanged over communication interface 106 could not be intercepted or taken over by an unauthorized person (e.g., with physically contacting equipment or otherwise).

Whether implemented as a cochlear implant system such as cochlear implant system 400, a hearing aid system such as hearing aid system 500, or in some other way, hearing system 100 may use one or more communications interfaces such as communication interface 106 to efficiently and resiliently communicate data between hearing devices and accessories of various types. To illustrate how such communication interfaces may be implemented FIGS. 6-10 will now be described to demonstrate various details regarding how frame protocol 112 may define data frames 110 and thereby provide multi-service data communication between a hearing device and an accessory in any of the hearing systems described herein.

Figure 6:
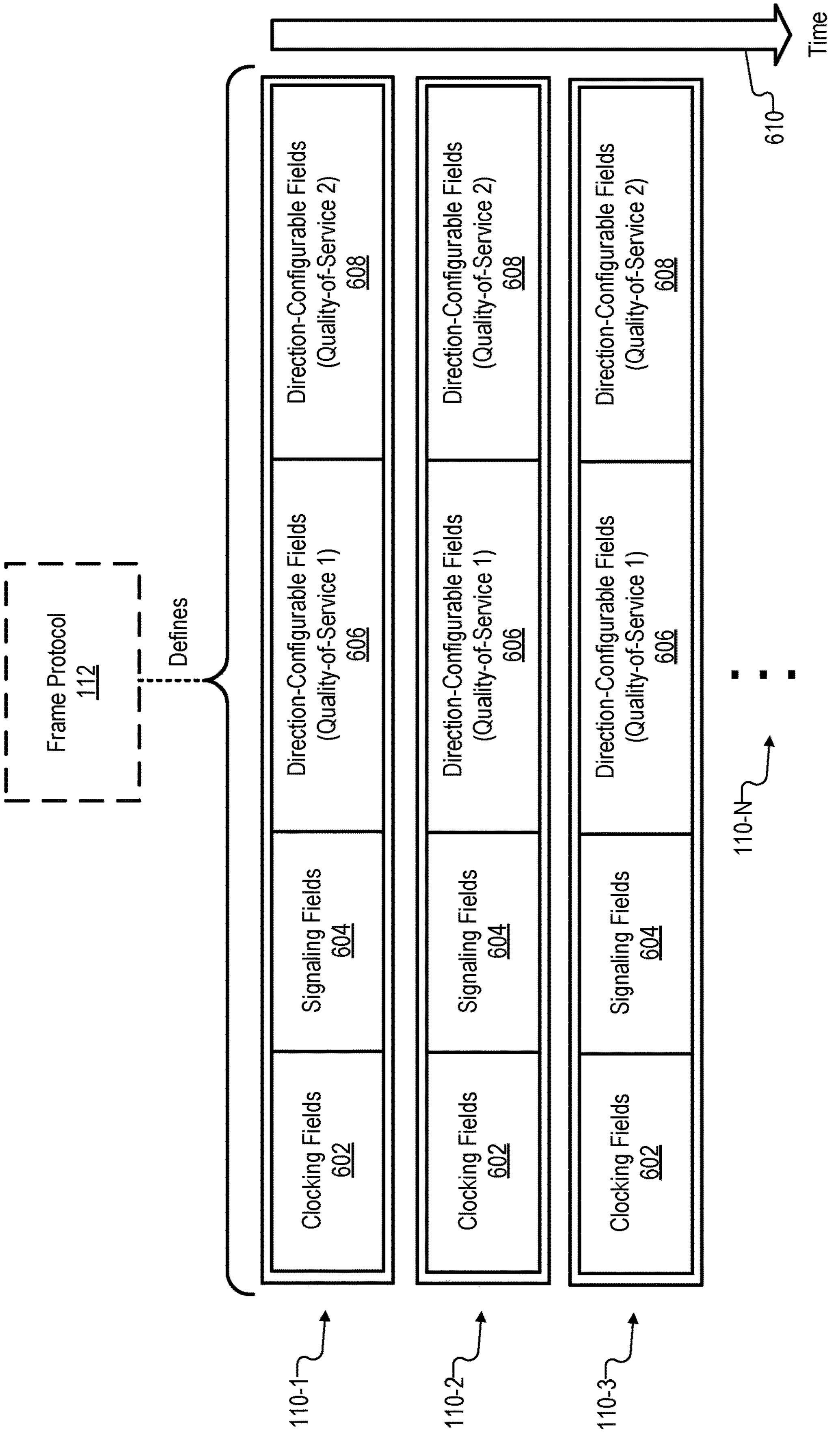
FIG. 6 shows illustrative data frames in accordance with a frame protocol employed by a communication interface between a hearing device and an accessory of a hearing system.

FIG. 6 shows a plurality of illustrative data frames 110 labeled as data frames 110-1 through 110-3, as well as an ellipsis representing additional similar data frames and labeled as data frames 110-N. As shown, each of these data frames 110 may be in accordance with (e.g., defined by) the frame protocol 112 employed by communication interface 106 between any of the hearing devices 102 and accessories 104 that have been described. As shown, each of data frames 110 may include various fields, including one or more clocking fields 602, one or more signaling fields 604, one or more direction-configurable fields 606 associated with a first quality-of-service ("Quality-of-Service 1"), and one or more direction-configurable fields 608 associated with a second quality-of-service ("Quality-of-Service 2"). These fields 602, 604, 606, and 608 will each be described and illustrated in more detail below with reference to FIGS. 7, 8, 9, and 10, respectively.

As further shown in FIG. 6, a timeline 610 illustrates that data frames 110-1 through 110-3 may be transmitted one after the other as time passes. The frame time duration for each frame (e.g., derived from the bitrate and number of bits of frame) may be determined based on a desired latency or responsiveness for a particular application (e.g., for particular services being performed by way of the data frames). The timing of each frame may also be dictated by the worst-case local clock drifting conditions for each endpoint (e.g., local clocking conditions at hearing device 102 and accessory 104), such that proper functionality of the data link may be maintained. Worst-case operating environments (e.g., accounting for temperature variations, voltage ranges, etc.) may also influence the timing of each data frame 110 communicated along timeline 610. Ultimately, frame protocol 112 may set forth timing parameters for data frames 110 that are slow enough to guarantee proper functionality even in worst-case conditions while also being configured to be fast enough to satisfy bandwidth throughput requirement of each particular data service being performed using the communications of data frames 110 for a particular application.

Within each data frame 110, certain fields and/or bits within the fields may include data that may be considered overhead data, signaling data, metadata, or the like (e.g., data that allows the communication interface 106 to function properly and efficiently). Additionally, each data frame 110 may include one or more datasets that may be considered payload data (e.g., communications that further the purpose of one or more data services). As used herein, a "dataset" communicated within a data frame 110 may refer to a discrete group of bits of this payload type of data. For example, as will be described and illustrated in more detail below, within a single data frame 110, a first dataset could be associated with a first data service that is performed in accordance with a first quality-of-service, a second dataset could be associated with a second data service that is performed in accordance with a different quality-of-service, and so forth for any number of datasets as may serve a particular example. Additionally, as will further be described and illustrated, a single data frame 110 may include certain datasets that are transmitted in one direction (e.g., from hearing device 102 to accessory 104) and other datasets that are transmitted in the other direction (e.g., from accessory 104 to hearing device 102).

Collectively, fields 602-604 may include any suitable data to implement any of the data services described herein (e.g., including various services associated with various qualities-of-service described below in relation to FIG. 11). For example, signaling data may be communicated by a principal endpoint (i.e., the "primary" or "master" endpoint for the data link, which will be understood to typically be determined at the outset of a communication session and to remain static throughout the session, though midsession changes could be possible in certain implementations) and/or by an agent endpoint (i.e., the "secondary" or "slave" endpoint for the data link, which will also be understood to typically be determined at the outset of a communication session and to remain static throughout the session, though midsession changes could again be possible in certain implementations) to express various information. This information could relate, for example, to arbitration of a control field, status of data buffers, retransmission requests, special frame markers occurring at specified frame counts along with CRC computed code, information specifying the size and/or direction of payload datasets to be communicated in the frame, forward error correction (FEC) and/or CRC code incorporated into the payload dataset itself, guard time bits to facilitate transmission direction changes, or the like. Timing or clocking-related data, payload data for real-time or control services, and/or any of the other types of data described herein may additionally or alternatively be transmitted within a given data frame 110.

While each data frame 110 may be configured as a discrete, standalone set of information (e.g., with its own clocking information, signaling information, payload data, etc.), it will be understood that communication interface 106 may implement a data link that may be employed by higher-level data services and protocols to communicate payload datasets longer than may fit in any given data frame 110. As such, frame protocol 112 may be configured such that a high-level dataset associated with a high-level data protocol may be communicated across a plurality of the data frames 110 defined by frame protocol 112. For instance, two higher-level data services operating in parallel with one another may both communicate payload datasets using data frames 110-1 through 110-3 by including a portion of their respective payloads in each of the data frames 110-1 through 110-3 (e.g., in one or more of the slots that will be described below). In this way, the services may operate concurrently and abstract away how data transfer actually occurs. As far as the higher-level services are concerned, each may transmit and receive data over communication interface 106 without regard for whether other services are also concurrently using the link. In these examples, frame protocol 112 may also provide mechanisms for checking/ensuring data integrity over the entire higher-level payload spanning the plurality of data frames 110.

FIGS. 7-10 will now be described to illustrate clocking fields 602 (FIG. 7), signaling fields 604 (FIG. 8), direction-configurable fields 606 (FIG. 9), and direction-configurable fields 608 (FIG. 10) in more detail.

Figure 7:
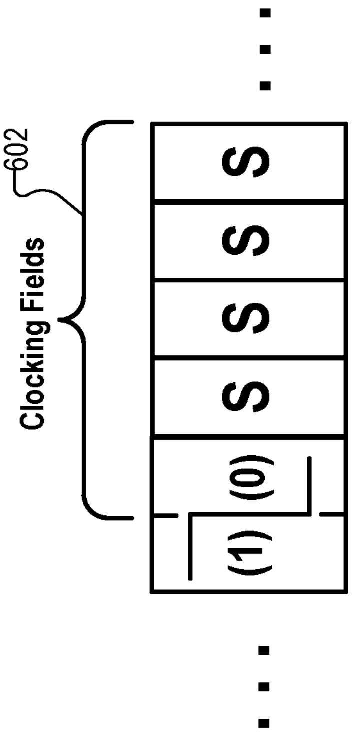
FIG. 7 shows illustrative clocking fields of the data frames of FIG. 6.

FIG. 7 shows illustrative clocking fields 602 that may be included in certain implementations of data frames 110 defined by frame protocol 112. In some examples, frame protocol 112 may define a timing service that facilitates data communication over conductors 108 to be self-clocking by, for example, relying on local clocks at each endpoint so as not to have to dedicate an additional wire for transmitting a clock with the data. To this end, frame protocol 112 may be configured to define data frames 110 to include (e.g., prior to fields in which any payload datasets are communicated) a clock regeneration field in which a principal endpoint transmits a preestablished data pattern to an agent endpoint to allow the agent endpoint to reconstruct a clock of the principal endpoint.

More particularly, these clocking fields 602 may provide clock regeneration information from a principal endpoint (e.g., hearing device 102 in one example) to an agent endpoint (e.g., accessory 104 in this example). This clock regeneration information may consist of a preestablished (known) data pattern which may facilitate clock reconstruction at the agent endpoint (e.g., accessory 104 in this example). For instance, the preestablished data pattern may consist of a ‘10’ binary pattern at this fixed location or a ‘101010’ data pattern where even the bits ‘S’ bits have been configured to transmit clock information. Based on this pattern, the agent endpoint may use its own high frequency clock and implement a digital phase locked loop (DPLL) or other such clocking circuitry (e.g., including a traditional PLL) to arrive at the data sampling clock for its data reception as well as data transmission operation. Since this type of clock embedding occupies a smaller bandwidth of the overall data frame, it may be efficient in terms of bandwidth usage. In this type of scheme, an optimization may be employed to guarantee that the overall frame time (i.e., the time between the clocking field of one data frame 110 and the next data frame 110) is small enough that any clock drift will not accumulate sufficiently to result in clocking or synchronization errors between the endpoints. In this way, the data link may be clocked reliably and continue to operate synchronously based on the local clocks at each endpoint, which may essentially be resynchronized at every data frame based on these fields.

In some examples, the data link defined by frame protocol 112 may involve a startup or initialization phase wherein only clock edges are transmitted while the rest of the data fields are encoded to certain unique values which makes it easy for the agent endpoint to align its recovered clock to the incoming clock reference. As part of this phase there may be an additional procedure configured to adjust the principal endpoint's receive data sampling edge adjustment to the optimal time point (usually mid-symbol position). Such a procedure may become necessary for longer cable lengths and also when the propagation delay through the circuits involved become a significant portion of the bit time width. This type of training phase may be performed after the clock recovery/reconstruction processes described above.

Figure 8:
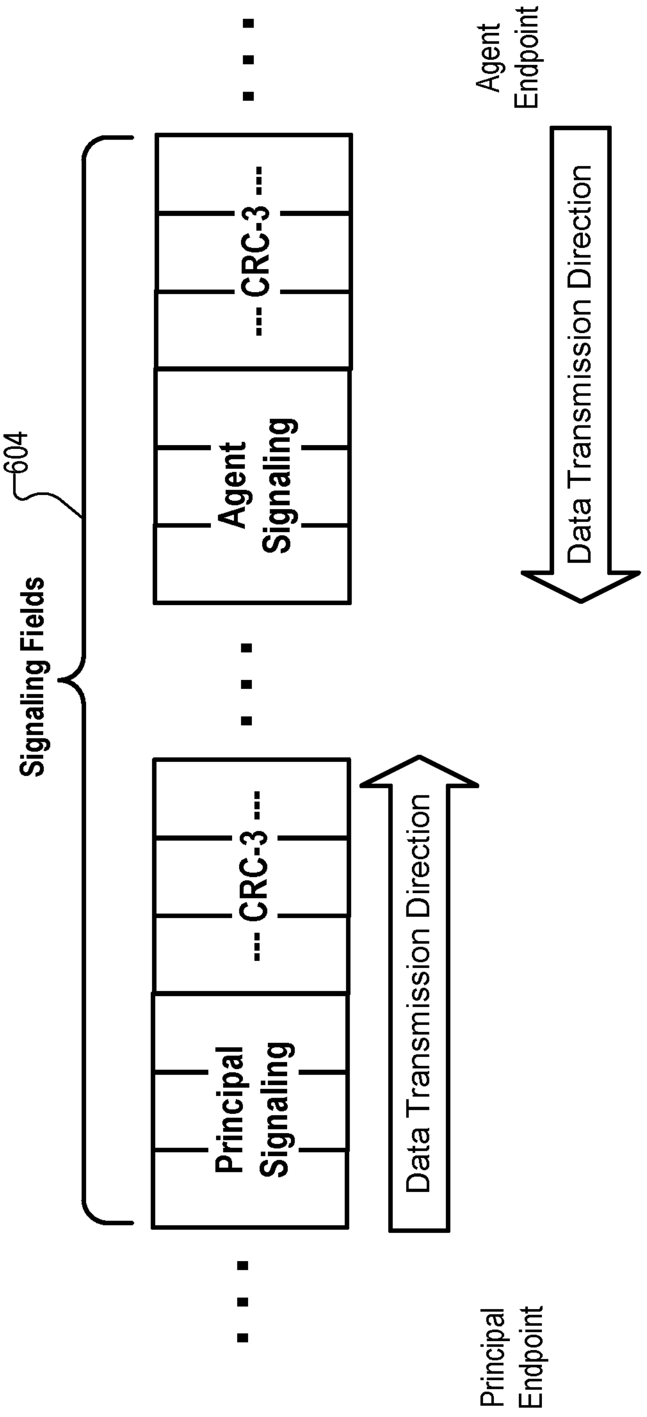
FIG. 8 shows illustrative signaling fields of the data frames of FIG. 6.

FIG. 8 shows illustrative signaling fields 604 that may be included in certain implementations of data frames 110 defined by frame protocol 112. As has been mentioned, the direction of data transfer between endpoints (e.g., from hearing device 102 to accessory 104 or from accessory 104 to hearing device 102) may be changed, including dynamically in the middle of a data frame. While a principal endpoint (e.g., hearing device 102 in one example) and an agent endpoint (e.g., accessory 104 in this example) may be statically determined (e.g., at the outset of a communication session), the changing of data flow direction means that, at a given time, one of the endpoints may act as a “present transmitting endpoint” while the other acts as the “present receiving endpoint.” When the data flow then changes directions, these statuses would reverse such that the former becomes the “prior transmitting endpoint” (and the new present receiving endpoint), while the latter becomes the “prior receiving endpoint” (and the new present transmitting endpoint).

As shown in FIG. 8, signaling fields 604 may include signaling information for both the principal endpoint (“Principal Signaling”) and the agent endpoint (“Agent Signaling”), as well as error-checking bits (“CRC-3”) associated with each of these. Ellipsis in FIG. 8 illustrate that these sets of signaling information may be found at any suitable position within a given data frame 110 (e.g., at the beginning, in the middle, at the end, etc.) and may not necessarily be implemented adjacently to one another. For example, the signaling fields for the principal endpoint may be located directly prior to clocking fields 602 in the frame, while the signaling fields for the agent endpoint may be located directly following these clocking fields 602 in the frame. This ordering may be advantageous to help avoid changing data directions more often than necessary (and to thereby limit how much of the frame needs to be dedicated to guard-time bits that facilitate such direction changes, as described in more detail below), but it will be understood that various ways of ordering the various fields of data frame 110 may suitably serve various implementations. For instance, in certain examples, all of the signaling fields may be placed consecutively (e.g., with one or more guard-time bits in between) at the beginning of the frame, directly after the clocking fields 602, or in another suitable location.

The signaling fields 604 may include any suitable number of signaling bits (e.g., three bits for “Principal Signaling” and three bits for “Agent Signaling,” as shown) followed by a suitable number of error checking bits (e.g., three bits for “CRC-3” shown to be following each set of signaling bits, as further shown). While three bits for each of these fields is shown in this example, it will be understood that any suitable number of signaling bits and any suitable number of error checking bits may be employed as may serve a particular implementation (whether these numbers are the same or different).

Below signaling fields 604, FIG. 8 illustrates transmission direction arrows ("Data Transmission Direction") indicative of which endpoint (either the "Principal Endpoint" on the left, or the "Agent Endpoint" on the right) transmits and receives this signaling information. Specifically, the principal signaling fields (signaling bits plus error checking bits) are shown to be transmitted from the principal endpoint to the agent endpoint, while the agent signaling fields (signaling bits plus error checking bits) are shown to be transmitted in the opposite direction, from the agent endpoint to the principal endpoint.

The signaling fields 604 associated with the principal endpoint may include any suitable types of information related to the data link status itself; the ownership, direction, role, etc., of various payload datasets and/or other fields to come later in the data frame (described in more detail below); requests for information from the agent endpoint; or other suitable information as may serve a particular implementation. As a few non-limiting examples of what may be communicated by way of these principal signaling bits, the principal endpoint may indicate: 1) that it has no information for the agent endpoint; 2) that it has control data to send to the agent endpoint; 3) a request for retransmission of previous data that was sent by the agent endpoint (e.g., control data, interrupt data, signaling data, etc.); 4) that the current data frame 110 is marked or designated as a synchronization frame (which may occur periodically at fixed intervals of time for synchronization purposes); 5) that it has an interrupt message for the agent endpoint; 6) that it is (or is not yet) ready to receive information; or any other such signaling information as may serve a particular implementation. The error-checking bits immediately following the principal signaling bits may then be configured to provide cyclic redundancy information for the principal signaling bits. This may allow the agent endpoint to determine if there is an error in its reception of the principal signaling bits and to request retransmission if necessary.

Like the signaling fields 604 associated with the principal endpoint, the signaling fields 604 associated with the agent endpoint may include any suitable types of information related to the data link status itself; the ownership, direction, role, etc., of various payload datasets and/or other fields to come later in the data frame; requests for information from the principal endpoint; or other suitable information as may serve a particular implementation. Similarly as described above for the principal endpoint, a few non-limiting examples of what may be communicated by the agent endpoint by way of these agent signaling bits include: 1) that the agent endpoint has no information for the principal endpoint; 2) that the agent endpoint has control data to send to the principal endpoint; 3) a request for retransmission of previous data that was sent by the principal endpoint (e.g., control data, interrupt data, signaling data, etc.); 4) that the current data frame 110 is marked or designated as a synchronization frame; 5) that the agent endpoint has an interrupt message for the principal endpoint; 6) that the agent endpoint is (or is not yet) ready to receive information; or any other such signaling information as may serve a particular implementation. Similarly as with the error-checking bits associated with the principal signaling bits, the error-checking bits immediately following the agent signaling bits may be configured to provide cyclic redundancy information for the agent signaling bits. This may allow the principal endpoint to determine if there is an error in its reception of the agent signaling bits and to request retransmission if necessary.

As has been described, frame protocol 112 may define data frames 110 such that the data transmission direction can dynamically change from frame to frame or even mid-frame (i.e., so that data flows one direction at one point in the frame and in the opposite direction at another point in the frame). In some example, different datasets associated with different data services performed in accordance with different qualities-of-service may be transmitted in different directions within a given data frame. For example, along with defining data frames 110 to communicate a first dataset associated with a first data service performed in accordance with a first quality-of-service and a second dataset associated with a second data service performed in accordance with a second quality-of-service, the frame protocol 112 may further define data frames 110 to communicate a third dataset associated with a third data service that is also performed in accordance with the second quality-of-service. These data frames 110 defined by frame protocol 112 may then be configured to support a mid-frame change of data transmission direction such that the second dataset is transmitted in one direction (e.g., from hearing device 102 to accessory 104) while the third dataset is transmitted in the opposite direction (e.g., from accessory 104 to hearing device 102).

There are various forms that these different datasets could take in different examples and signaling fields 604 may be used to help determine which direction each data frame (and each individual dataset included within each data frame) is to be transmitted. For instance, to support the mid-frame change of data transmission direction in this example, a data frame 110 may include signaling fields configured to accomplish the objectives set forth above. For example, a first signaling field may be used by the principal endpoint to communicate transmission status information for the principal endpoint (e.g., whether the principal endpoint has information to send, what type of information it has, whether it has a request for information, etc.). A second signaling field may then be used by the agent endpoint to communicate transmission status information for the agent endpoint (e.g., whether the agent endpoint has information to send, what type of information it has, whether it has a request for information, etc.).

When the transmission status information for both the principal endpoint and the agent endpoint indicates that both endpoints have information to send to the other, arbitration may be performed to determine how the relevant payloads of the data frame will be used (e.g., which direction payload fields will go). To this end, frame protocol 112 may define a set of arbitration rules configured to resolve a transmission conflict introduced by the transmission status information for the principal endpoint and the transmission status information for the agent endpoint. As one example set of arbitration rules, for instance, frame protocol 112 may define arbitration such that: 1) retransmission requests from the principal endpoint are given highest priority (e.g., either due to signaling or payload CRC errors); 2) retransmission requests from the agent endpoint are then given the next priority (e.g., either due to signaling or payload CRC errors); 3) interrupt transmission from the principal endpoint is given next priority; 4) interrupt transmission from the agent endpoint is given next priority; 5) no data transmission occurs if either endpoint to receive a transmission indicates it is not ready for data; 6) a control data transmission from the principal endpoint is given next priority; 7) a control data transmission from the agent endpoint is given next priority; and 8) if neither side has data to transmit, a unique data pattern is transmitted by the principal endpoint or no transmission occurs (e.g., to save power). It will be understood that these arbitration rules are provided by way of example only and that other suitable sets of arbitration rules may be implemented as may serve a particular embodiment.

Another use of signaling fields 604 (e.g., in implementations involving greater numbers of signaling bits, etc.) may be to allow the endpoints to negotiate allocation of bandwidth per service. As will be described and illustrated in more detail below, a plurality of different datasets (e.g., payload) associated with different qualities-of-service (e.g., control and/or real-time qualities-of-service) may be available for use by various services requesting to transmit data in different directions for different data frames. Which slots or payload datasets are allocated to which services (including if more than one slot is allocated for a particular service needing higher bandwidth, etc.) may be negotiated and determined based on information exchanged via signaling fields 604. For example, the proportion of bandwidth reserved in a data frame for different services and different qualities-of-service (e.g., for a control logical channel and a real time data logical channel) may be reallocated at runtime through suitable messages using data exchanged via signaling fields 604 between the agent endpoint and principal endpoint. An exact moment may also be synchronized when such a switch would take place to effect a new or changed allocation. Such a modification of bandwidth allocation may be helpful, for example, when downloading code to an accessory such as an active headpiece or a cochlear implant at startup time when the control bandwidth needs to be more (e.g., so as to achieve faster boot time for the active headpiece and implant). After this start sequence, allocation may then be altered such that the real time data logical channels and services may take more precedence as the hearing system enters a normal mode of operation. In some examples, this negotiation may be performed using messages delivered by way of other fields (e.g., direction-configurable control fields, etc.) rather than the signaling fields.

Figure 9:
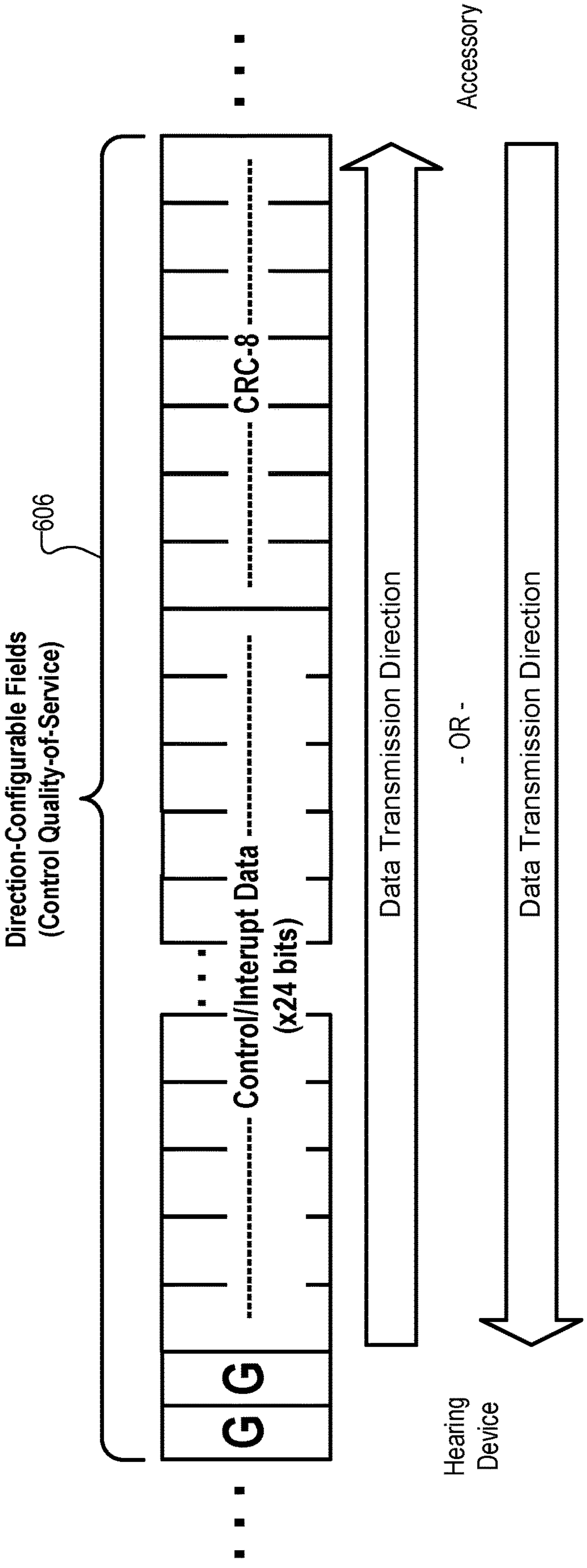
FIG. 9 shows illustrative direction-configurable fields associated with a first quality-of-service for communicating payload data within the data frames of FIG. 6.

FIG. 9 shows illustrative direction-configurable fields 606 associated with a first quality-of-service for communicating payload data within certain implementations of data frames 110 defined by frame protocol 112. More particularly, as shown, this first quality-of-service may be a "Control Quality-of-Service" configured to guarantee data integrity even at the expense of latency (e.g., such as by requesting data retransmission when data errors are detected, even in spite of the added latency that results from such retransmission).

In FIG. 9, direction-configurable fields 606 are shown to include two guard time bits (labeled "G") that immediately precede 24 bits of a payload dataset ("Control/Interrupt Data") associated with the control quality-of-service and 8 bits of error-checking bits ("CRC-8"). As described above for other fields, it will be understood that the number of bits in each of these fields is shown for illustrative purposes only, and that other suitable numbers of bits for any of these fields (e.g., the guard time field, the payload field, or the error-checking field) may be employed as may serve a particular implementation. In some examples, one or more of these fields may not be employed, such that the suitable number of bits used would be zero. For example, in implementations involving very short propagation times (e.g., for inter-chip communications such as mentioned above), it may be desirable to use one or zero guard-time bits and to instead handle direction changes by the transmitting endpoint enabling a bus-keeper function mid bit and then ceasing transmission or by another suitable technique.

As has been described, certain fields within data frames 110 defined by frame protocol 112 may be "direction-configurable," meaning that, from frame to frame, or even from one field (or dataset) to another field (or dataset) of the same type (e.g., another data slot as described in more detail below), the data transmission direction may change according to whatever the endpoints have negotiated (e.g., by way of signaling fields 604, control messages, etc., as described above). FIG. 9 shows one example of a direction-configurable field that, as illustrated by transmission direction arrows below direction-configurable fields 606 ("Data Transmission Direction"), may involve either data transmission from hearing device 102 ("Hearing Device") to accessory 104 ("Accessory") or data transmission from accessory 104 to hearing device 102. For instance, based on signaling bits and arbitration rules described above (e.g., and communicated in prior frames), these direction-configurable fields 606 may involve data transmission in one direction (e.g., from the hearing device to the accessory) for one data frame 110 while then involving data transmission in the opposite direction (e.g., from the accessory to the hearing device) for the next data frame 110. Each of the direction-configurable fields 606 will now be described in more detail.

Because frame protocol 112 may define data frames 110 to include a plurality of direction-configurable fields (e.g., including direction-configurable fields 606 for communicating one dataset and other direction-configurable fields for communicating other datasets), frame protocol 112 may also define, prior to each direction-configurable field in the plurality of direction-configurable fields included in the data frames, a guard time configured to facilitate a mid-frame change of data transmission direction and during which no data is communicated. As shown in FIG. 9, this guard time may be allocated by the time associated with two guard-time bits labeled "G" that immediately precede the Control/Interrupt Data payload dataset. While no data may be communicated during the guard time represented by these bits, the time intervals allotted by these bits may facilitate the mid-frame change of data transmission direction by giving each endpoint time to prepare for the mid-frame direction change. For example, the allotted guard time may provide time for turning on and/or turning off transmission and/or receiving circuitry, for applying or removing termination resistance from transmission or receiving circuitry (as will be described in more detail below), for allowing various analog and digital data links to settle to operational states (if starting from power-down modes or standby or low-power modes), for allowing finite propagation delays on conductors 108 (e.g., due to finite speed of traveling electromagnetic waves on the conductors), for allowing voltages on the conductors 108 to settle (allowing voltage reflections and ringing to subside, etc.), for ensuring that slight timing or synchronization discrepancies between the endpoints do not lead to a bus collision (in which both endpoints attempt to drive a voltage on the conductor at the same time, hence stressing transmission and/or receiver circuitry and/or leading to excessive current and/or voltage on the circuit nodes), and so forth. As mentioned above, in certain examples (e.g., particularly when propagation delays are minimal), it may be possible to use other techniques that do not involve guard-time bits (or involve fewer guard-time bits) to facilitate mid-frame changes of data transmission direction. For example, if the propagation delay is less than half of the total bit time, a transmitting endpoint may resolve a bus conflict by turning on a bus keeper function midway through the transmission of a bit (and then ceasing transmission).

Once the data transmission direction has been changed (if necessary) and each of the endpoints is ready to transmit or receive (as the situation may call for), a payload dataset (e.g., of 24 bits in this example) may be communicated. This payload may include any communications associated with a data service performed in accordance with the control quality-of-service, and may be communicated based on priority or arbitration rules such as described above. The control payload may provide support for sporadic, low-latency, low-throughput interrupts services (e.g., to mark information being available, to indicate error conditions or other triggers, etc.), as well as support for bidirectional, high-reliability control, command, configuration, status read data services. As one example, frame protocol 112 may define data frames 110 to include a direction-configurable interrupt field in which an interrupt dataset associated with an interrupt data service (described in more detail below) is communicated in accordance with a control quality-of-service (e.g., a quality-of-service configured to guarantee error-free data transfer by tolerating added data latency from data retransmission when data transmission errors are detected). As another example, this payload could be used for control purposes such as downloading code and data for CPU or logic circuitry of the accessory (e.g., the active headpiece or cochlear implant, etc.), for configuring or inquiring status (or initiating read operations) of data/control elements in firmware or digital/analog circuits in the accessory, or the like. Certain accessories implemented as sensors may be configured to provide data using control fields such as direction-configurable fields 606. For instance, blood pressures, blood-oxygen levels, and other such biometric measurements may be reported using the reliable control quality-of-service. Examples of control and interrupt services that may communicate information between the endpoints by way of this payload field will be described in more detail below.

Similarly as described above with respect to signaling fields 604, several bits of error-checking may immediately follow the payload field of direction-configurable fields 606. For instance, as shown in this example, 8 CRC error-checking bits may be used to verify the 24-bit payload so that, if an error is detected, the present receiving endpoint may request retransmission to ensure the integrity of the ultimate data received (as per the control quality-of-service requirements/specifications). In some examples, control data may be fed to higher-layer protocols to further aggregate and/or separate other logical channels from one stream of information. While this will not be described in detail in this disclosure, it will be understood that such communications may contain the destination identity, communication length, a communication CRC, and so forth. Accordingly, registers may be uniquely identified within various types of accessories (e.g., active headpiece ICs, CPU threads inside the active headpiece, etc.). By defining the entire length of the communication unambiguously, any errors in the communication may be detected across packets using the communication CRC.

Figure 10:
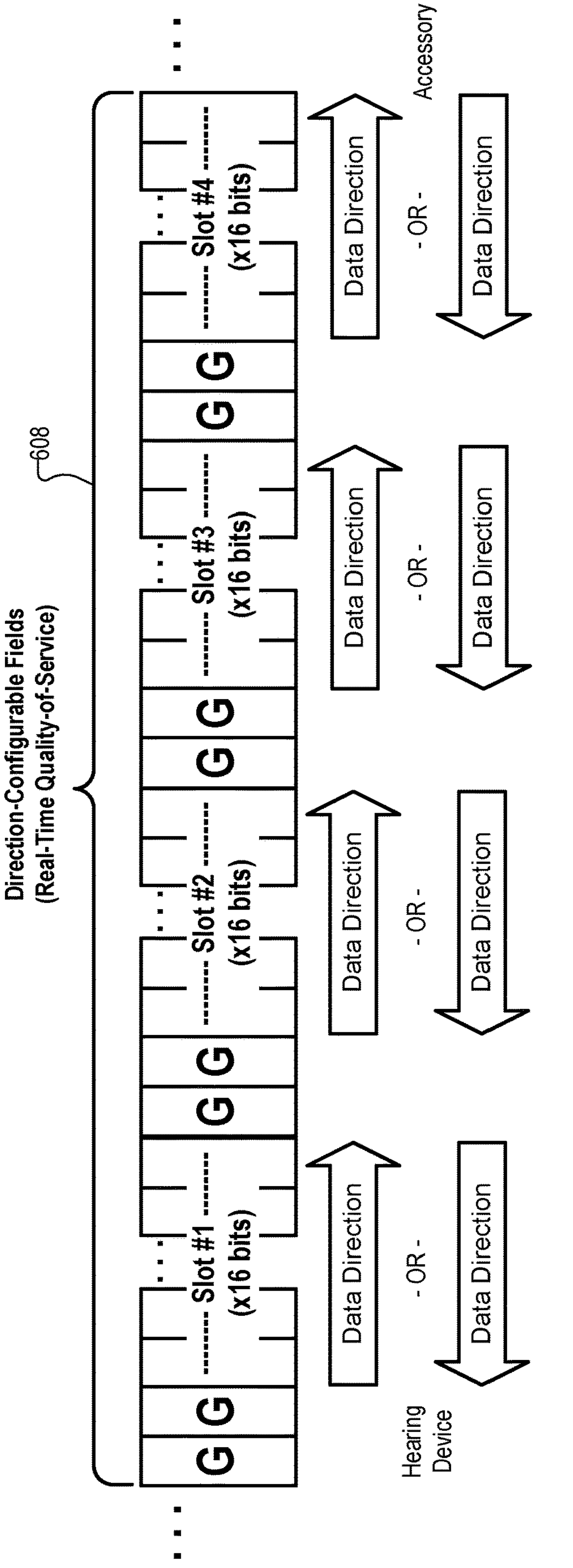
FIG. 10 shows illustrative direction-configurable fields associated with a second quality-of-service for communicating payload data within the data frames of FIG. 6.

FIG. 10 shows illustrative direction-configurable fields 608 associated with a second quality-of-service for communicating payload data within certain implementations of data frames 110 defined by frame protocol 112. More particularly, as shown, this second quality-of-service may be a "Real-Time Quality-of-Service" configured to minimize latency even at the expense of data integrity (e.g., such as by abstaining from error checking the payload data and/or forgoing data retransmission requests in cases when error-checking is performed and data errors are detected).

In FIG. 10, direction-configurable fields 608 are shown to include a plurality of 16-bit payload slots ("Slot #1", "Slot #2", "Slot #3", and "Slot #4", in this example), each of which is immediately preceded by two guard time bits (labeled "G"). As described above for other fields, it will be understood that the number of bits in each of these fields is shown for illustrative purposes only, and that other suitable numbers of bits for any of these fields (e.g., the guard time fields or the payload slots) may be employed as may serve a particular implementation. For instance, more or fewer than 16 bits may be used for each payload slot in certain implementations. Additionally, instead of the uniformly-sized slots shown in FIG. 10, it will be understood that non-uniformly sized slots may also be employed in certain use cases (e.g., a first slot that is 16 bits and associated with one data service, followed by a second slot that is 24 bits and associated with a different data service, followed by a third slot that is 8 bits and associated with yet another data service, etc.).

The guard time bits preceding each payload dataset (i.e., each of slots 1-4) may function in the same way as described above for the guard time bits in direction-configurable fields 606 of FIG. 9. Accordingly, as illustrated by the four sets of transmission direction arrows below the payload slots of direction-configurable fields 608 ("Data Direction"), the data transmission direction for each slot may be individually and independently determined (and, in some examples, dynamically changed from frame to frame) for each of these payload datasets. For example, referring again to the multiple datasets described above to be associated with multiple data services and to be sent in different directions within a single data frame, one way that this may be done is by transmitting direction-configurable fields 606 in a first direction (e.g., from hearing device 102 to accessory 104) while direction-configurable fields 608 are all transmitted in the opposite direction (e.g., from accessory 104 to hearing device 102). Alternatively, this situation may also occur when different real-time data slots are transmitted in different directions (e.g., Slot #1 being transmitted from hearing device 102 to accessory 104 while Slot #2 is transmitted from accessory 104 to hearing device 102, etc.). Accordingly, it will be understood that for a given frame, each of the datasets associated with the different Slots 1-4 shown in FIG. 10 may be sent in either direction as may serve a particular use case (e.g., based on signaling bits, control bits, and/or other data previously transmitted in the same data frame or an earlier data frame). For instance, the transmission direction for all four slots could be from the hearing device to the accessory in one frame, the transmission direction for all four slots could be from the accessory to the hearing device in another frame, and the transmission direction could change from slot to slot in other frames (e.g., such that one, two, or three of the slots are in one direction while the remainder are in the other direction).

Once the data transmission direction has been changed (if necessary) and each of the endpoints is ready to transmit or receive a particular dataset associated with one of the Slots 1-4, a payload dataset (e.g., of 16 bits in this example) may be communicated. Each of these payload datasets may include any communications associated with a data service performed in accordance with the real-time quality-of-service. For example, these real-time payload slots could be used for communicating microphone or other audio data, communicating forward or back telemetry data (e.g., to or from a cochlear implant coupled to an active headpiece), communicating RF power control data, communicating cochlear implant timing reconstruction data, communicating microphone or measurement data (e.g., neurological objective measurement data captured by the cochlear implant and/or active headpiece), or the like. Certain accessories implemented as audio sources (e.g., microphones) or audio sinks (e.g., loudspeakers) may be configured to communicate data using real-time fields such as direction-configurable fields 608. For instance, audio data being captured or presented may be real time in nature and may be best handled using the real-time quality-of-service provided by direction-configurable fields 608. Data transmitted by certain types of sensors may also be real-time in nature and may be communicated by these fields as well. Examples of real-time services that may communicate information between the endpoints by way of these real-time payload fields will be described in more detail below.

In some examples, data communicated by way of direction-configurable fields 608 may be protected using data interleaving, forward error correction (FEC) codes, CRC error checking, and/or other such methods (not explicitly shown in FIG. 10). The interleaving and de-interleaving process may enable burst errors to be spread across multiple FEC code words such that individual FEC code words have fewer bits to correct (if any). Addition of a CRC check may then provide an indication of any residual bit errors. Based on these residual errors, a particular implementation may perform an action as per the demands of the service (e.g., terminating the service, a packet loss concealment algorithm applicable for a particular audio type of service logical channel, etc.).

The real-time data slots of direction-configurable fields 608 may be used not only for various real-time services (described in more detail below) but also for non-real-time or packetized type of information. Such packets may contain packet headers, packet data, packet CRCs, and so forth, and may span multiple slots or multiple fields so as to concatenate the bandwidth provided by each slot. Additionally or alternatively, such packets may use a time slot whose width is designed to fit the needs of the service or the packet could extend over multiple data frames as per the size of the packet. In between such packets there could be filler data words that may be ignored by the receiver. These constructs may similarly be employed for real-time services as well. Unused real-time payload datasets may be configured to transmit known data patterns and/or may be disabled at the transmitter endpoint so as to reduce power consumption.

In the extended example described in relation to FIGS. 6-10 (e.g., with four 16-bit real-time slots, one 24-bit control payload, signaling and error-checking fields as shown, etc.), it is noted that one data frame 110 is defined by frame protocol 112 to include a total of 128 bits. This size of data frame may be advantageous in various ways for certain applications (e.g., large enough to efficiently communicate data for various data services without being too large). However, as has been mentioned, it will be understood that a frame protocol may define other sizes of data frames (composed of different fields or differently-sized fields than those that have been described) based on the same principles described herein to better serve other applications in accordance with their unique characteristics.

Based on principles described above (i.e., principles defined by frame protocol 112 for each data frame 110), data communication between hearing device 102 and accessory 104 may be performed by communication interface 106 to currently perform multiple data services associated with any of the hearing system operations described herein. Such data communication is referred to herein as "multi-service" data communication. To illustrate certain data services that may be performed in accordance with different qualities-of-service such as described above (e.g., the control quality-of-service, the real-time quality-of-service, etc.), a communication stack will now be described that hearing system 100 may employ to exchange communications between hearing device 102 and accessory 104.

Figure 11:
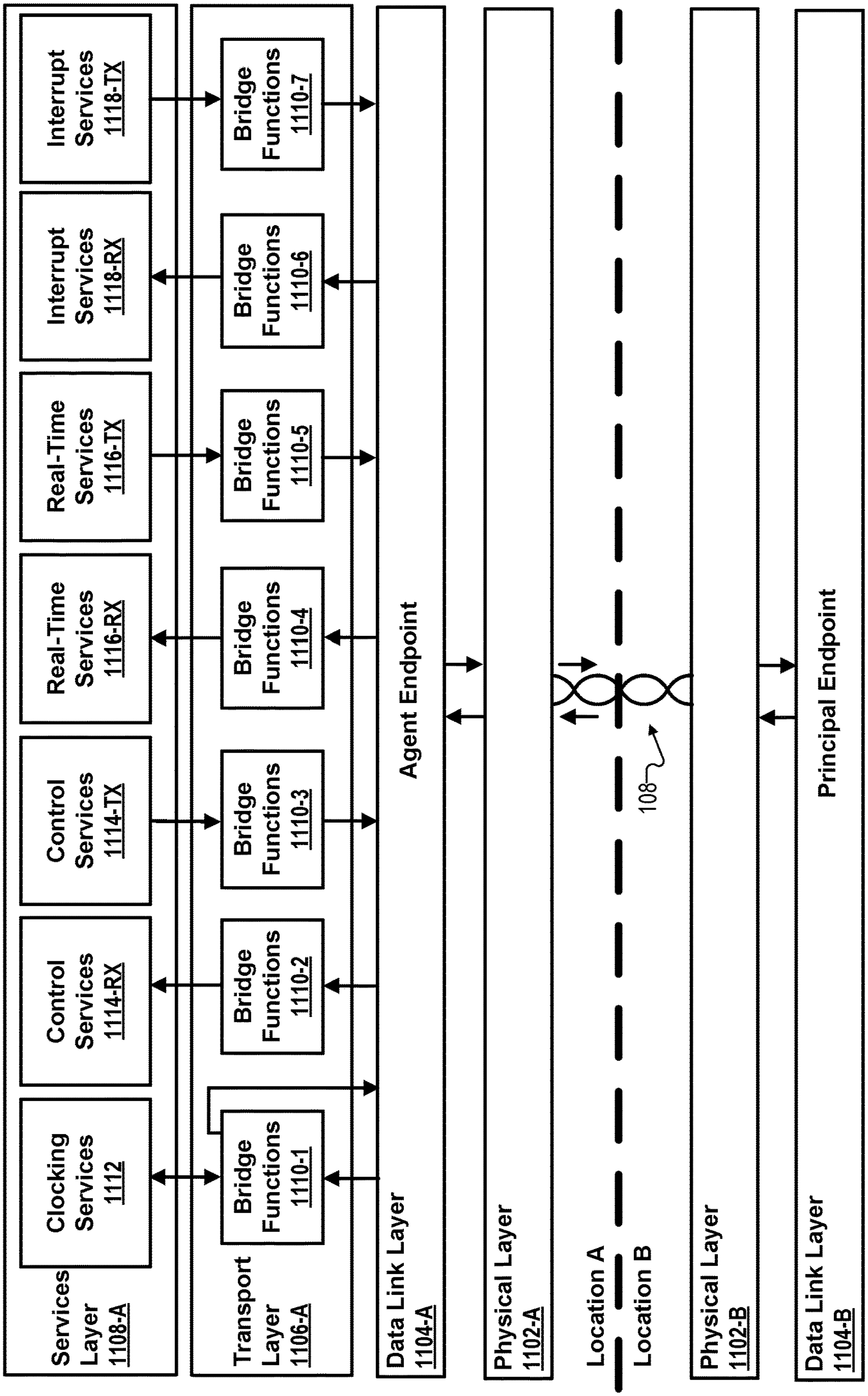
FIG. 11 shows an illustrative communication stack by way of which various data services may be implemented to achieve objectives of hearing systems described herein.

Specifically, FIG. 11 shows an illustrative communication stack 1100 that may be used to implement various data services performed in accordance with different qualities-of-service to achieve objectives of hearing systems described herein (e.g., implementations of hearing system 100 such as cochlear implant system 400 and hearing aid system 500, etc.). As shown, illustrative communication stack 1100 may include various layers (e.g., similar or analogous to layers of other stacked communication models such as the OSI or TCP/IP networking models or the like). It will be understood that both endpoints (e.g., hearing device 102 and accessory 104) may incorporate the same or a similar illustrative communication stack, though only one stack is illustrated in detail in FIG. 11. Specifically, an agent endpoint such as accessory 104 may be disposed in one location on the recipient ("Location A") and may implement the communication stack with layers ending in "-A", while a principal endpoint such as hearing device 102 may be disposed in another location on the recipient ("Location B") and may implement the parallel communication stack with layers ending in "-B" (not all of which are shown in FIG. 11).

As illustrated, both the agent endpoint and the principal endpoint may include a respective physical layer 1102 (i.e., physical layer 1102-A for the agent endpoint and physical layer 1102-B for the principal endpoint), a respective data link layer 1104 (i.e., data link layer 1104-A for the agent endpoint and data link layer 1104-B for the principal endpoint), a respective transport layer 1106 (i.e., transport layer 1106-A for the agent endpoint, not shown for the principal endpoint), and a respective services layer 1108 (i.e., services layer 1108-A for the agent endpoint, not shown for the principal endpoint). FIG. 11 also shows various bridge functions 1110 (e.g., bridge functions 1110-1 through 1110-7) that may be performed as part of the transport layer 1106, as well as a variety of data services that may be performed as part of the services layer 1108. As shown, these services may include services such as, without limitation, clocking services 1112, control services 1114-RX (for received data), control services 1114-TX (for transmitted data), real-time services 1116-RX (for received data), real-time services 1116-TX (for transmitted data), interrupt services 1118-RX (for received data), and interrupt services 1118-TX (for transmitted data). Each of the elements shown in FIG. 11 will now be described in more detail.

Physical layers 1102 may provide any suitable physical support for transmitting data between the endpoints. For example, along with conductors 108 between the endpoints (described in more detail above), respective physical layers 1102 may include signal transmission circuitry, signal receiving circuitry, power circuitry, and so forth. Among other features, physical layers 1102 may provide low-voltage differential current drive circuits (or other drive circuitry as may serve a particular implementation) that are configurable and trimmable for accuracy, as well as receiver circuits whose logic level detection threshold voltages are configurable and trimmable (including offsets). Physical layers 1102 may be configured to support the allocated guard time bits described above to facilitate prevention of transmission drive collisions and settling of voltages (and/or reducing/removing of power from transceiver circuits) during channel driver direction switch. Physical layers 1102 may also support training sequences to startup the data link and transmit unique data patterns to enable clock reconstruction described herein, as well as supporting startup protocols that enable either endpoint to initiate startup from a low-power state and various schemes whereby used portions of the data frame may result in no signal being transmitted (to generate power savings).

Along with these features, physical layers 1102 may also support termination resistances at each endpoint that are applied only during prescribed durations of data reception (e.g., including a short amount of time prior and subsequent to data being received). Specifically, during each guard time described above in which a mid-frame change of data transmission direction occurs (such that a prior transmitting endpoint becomes a present receiving endpoint and a prior receiving endpoint becomes a present transmitting endpoint), the present transmitting endpoint may be configured to remove a first termination resistance from a transmission circuit of the present transmitting endpoint, while the present receiving endpoint may be configured to apply a second termination resistance to a receiving circuit of the present receiving endpoint. By dynamically applying and removing terminations resistances in this way (such that termination resistances are present only at the receiving end in any given data transmission), physical layer circuitry may prevent reflection and maximize how much of the signal is received. For example, if termination resistances are applied statically to both sides, the transmitted signal would be attenuated by half at the transmission side. However, by removing this transmission resistance and only applying receiving resistances, the full strength of the signal may be transmitted, thereby increasing signal-to-noise of the signal, allowing power efficiency to be optimized, and providing other such benefits. These benefits may be further augmented by other features including, for example, turning off the receiving circuitry to save power during transmission, placing the transmitting circuitry in a low-power mode during data reception (or completely turning it off, though the low-power mode may be preferable to allow a more rapid restart of the circuitry when data transmission begins again), and so forth.

In certain examples, physical layers 1102 may support various hearing system use cases and scenarios that have been described and/or that may arise in typical use. To this end, physical layers 1102 may include any or all of the following properties and features. The transmission circuitry may make use of a low-voltage differential current driver, which may result in slow and controlled rising signals and in lower emissions from the data link itself. Configurable settings may also affect the magnitude of current that is driven to help achieve applicable emissions goals. When a twisted pair of conductors 108 is employed to carry differential signaling, physical layers 1102 may contain the electric and magnetic fields within the confines of the twisted cable and, since the drive is symmetric (differential in nature), the electromagnetic radiation is therefore minimized. Termination resistances applied at the receiving end of the link may have magnitudes configured to match the characteristic impedance of the cable. In this way, electromagnetic wave reflections from the other end of the cable (due to impedance mismatches) may be reduced. A configurable or programmable current drive strength and/or receiver detection threshold may allow the system to adjust the signal-to-noise targeted for operation of the data link (e.g., allowing for suitable signal-to-noise to be achieved based on setting of various parameters). Circuitry may detect fault conditions such as when the other endpoint is not driving the line as expected or other error detection conditions. Such circuitry may support fail-safe circuits that may further perform additional types of fault detection (e.g., short circuit between the conductors, short to ground or supply line that may be present in the same cable bundle, etc.).

The transmitting (driving) and receiving transceiver circuitry implemented in physical layers 1102 may support any of the following features: current direction that is based on the bit that is being driven, current having a magnitude that is configurable and trimmable, current sources that can be turned off during silence intervals of the frame, current sources that can be fully or partially turned off to achieve a desired power/speed tradeoff, current sources whose speed of transition can be controlled to reduce spikes and emissions, receiver comparator circuitry featuring threshold voltages that may be specified and trimmed, receiver comparator circuitry featuring offset voltages that can be trimmed, receiving circuitry that may be fully or partially turned on or off based on power requirements and/or specifications of the data frame, termination resistors that may be applied when the receiver is enabled and/or when both the transmitter and receiver are enabled, termination resistors whose values may be specified and trimmed, transmission of data that is scrambled with pseudo-random number generators to "whiten" the spectrum and minimize emissions, and/or various other features as may serve a particular implementation.

Data link layers 1104 may define the communication formats (e.g., based on data frames 110 described above) and/or otherwise provide any suitable data link support for transmitting data between the endpoints. To provide a flexible and resilient data format suitable for various hearing devices described herein, data link layers 1104 may provide and support any suitable features. For example, data link layers 1104 may be configured to flexibly allocate bandwidth for higher-layer services (e.g., services 1112 through 1118, described in more detail below, or other data services described herein), and may do so statically or dynamically as per the requirements of the higher-layer protocols (e.g., transport layer and services layer protocols). Data link layers 1104 may also be configured to encode error detection and/or correction according to what a particular quality-of-service with which a data service is performed may need. As mentioned above, this error detection and correction may be performed both at the data frame level (i.e., frame by frame for each frame payload dataset) as well as at the application level (i.e., to check payloads that span multiple data frames). Data link layers 1104 may further be configured to detect and request retransmission requests from the other side for message and signals that may require support. Retransmission requests may be performed when errors are detected for data transmitted in connection with certain qualities-of-service (e.g., the control quality-of-service), as described above.

In some examples, another feature that data link layers 1104 may implement involves scrambling of data contents of either real-time and/or control data. For instance, a known pseudo-random sequence of bits (e.g., derived from a PRBS generator) may be used to predictably scramble data being transmitted to thereby break down any periodicity within the data pattern and to help randomize (or "whiten") the data so that its spectral content will be spread across a broader spectrum. This randomization may help in meeting EMI/EMC regulations by spreading energy spiking at any given frequency to other frequencies. This type of data scrambling may be performed in a synchronized manner between the endpoints.

Transport layers 1106 (of which only transport layer 1106-A is explicitly shown in FIG. 11) may perform various operations including segmenting data from (and, on the other end, reassembling data for) the services layer, handling flow control for the communication interface, performing error checking (and, when errors are detected, requesting retransmission when appropriate), synchronization functions implemented using PLLs, or DPLLs, and so forth. To accomplish these operations, a plurality of bridge functions 1110 is shown in within transport layer 1106-A between data link layer 1104-A and the services of services layer 1108-A. These bridge functions may all perform the same or similar operations in certain implementations, or may be customized to the particular data services they correspond to.

For instance, bridge functions 1110-1 are shown to correspond to clocking services 1112 and, as such, may be understood to include or associated with one or more PLLs or DPLLs (or other suitable timing circuitry) used by clocking services 1112 so as to recover and/or synchronize a clock from incoming data frames (e.g., using the clocking fields 602, as described above) and to provide the recovered clock back to data link layer 1104-A. In some examples, the PLL or DPLL function may be implemented within another layer such as within respective physical layers 1102. Wherever these functions are implemented, they may provide a clock that has been derived for local operations such reception and/or transmission of the data bits in any of the ways described herein. A DPLL may also provide a reference clock (or derivative) to a higher-level function such that it can perform operations such as, for example, audio sampling of a local audio source (which may be beneficial since the audio sampling rate would be at natively sampled at that clock and there would be no need to perform computationally intensive operations to asynchronously convert the sample rate). Another example application of such a clock could be to measure the count values of a counter that is running off a local clock at points in time as determined by the DPLL-derived clock. Such sampled values may be transmitted as one of the real time services or control services to the other endpoint (e.g., to thereby enable the other endpoint to construct a local representation of the local clock of this endpoint for use in various operations such as sending data at an optimal rate that does not overflow or underflow any buffer). In FIG. 11, the data link layer 1104-A of the agent endpoint (which as described above, may be the endpoint to receive clocking information and readjust its local clock accordingly) is shown to receive feedback (e.g., the DPLL-derived clock signal) from bridge functions 1110-1. It will be understood that an analogous operation relating to providing this clock may be performed by the principal endpoint using similar clocking services and bridge functions.

Bridge functions 1110-2 may involve processing of received control communications (i.e., communications transmitted to control services 1114-RX), including, in some examples, CRC and/or other error-checking functions. Similarly, bridge functions 1110-3 may involve processing of transmitted control communications (i.e., communications transmitted by control services 1114-TX), including, in some examples, CRC and/or other error-checking functions.

Bridge functions 1110-4 may involve processing of received real-time communications (i.e., communications transmitted to real-time services 1116-RX), including, in some examples, data deinterleaving, FEC and/or other error correction schemes, CRC and/or other error-checking functions, and so forth. Similarly, bridge functions 1110-5 may involve processing of transmitted real-time communications (i.e., communications transmitted by real-time services 1116-TX), including, in some examples, data interleaving, FEC and/or other error correction schemes, CRC and/or other error-checking functions, and so forth.

Bridge functions 1110-6 may involve processing of received interrupt communications (i.e., communications transmitted to interrupt services 1118-RX), including, in some examples, CRC and/or other error-checking functions. Similarly, bridge functions 1110-7 may involve processing of transmitted interrupt communications (i.e., communications transmitted by interrupt services 1118-TX), including, in some examples, CRC and/or other error-checking functions.

Services layers 1108 (of which only services layer 1108-A is explicitly shown in FIG. 11) may perform various operations associated with higher-level data services that build on the lower layers to accomplish higher-level tasks. In certain implementations, services layers 1108 may perform operations associated with higher-level functional layers of other communication models. For instance, referring to the OSI model, services layers 1108 may be configured to perform operations associated with the session layer (e.g., creating communication sessions between the endpoints, ensuring these sessions remain open and functional while data is being transferred, closing sessions when communication ends, setting checkpoints during data transfer, etc.), the presentation layer (e.g., defining how two devices should encode, encrypt, and compress data so it is received correctly on the other end), the application layer (e.g., allowing software to send and receive information and present meaningful data to users), etc., to the extent that these higher-level operations apply to hearing device use cases.

Performing these various high-level operations, a plurality of data services 1112-1118 are shown in FIG. 11 to communicate from services layer 1108-A, down through the other layers that have been described, to transmit and receive communications over communication interface 106. Various aspects of these data services, including aspects related to the different qualities-of-service they each use, have been described above. For example, as has been mentioned, certain data services (e.g., clocking services 1112, real-time services 1116-RX and 1116-TX, etc.) may be implemented as real-time services using a first quality-of-service configured to guarantee a particular data latency by tolerating data transmission errors and forgoing data retransmission when data transmission errors are detected. In contrast, and concurrently with these real-time services, other data services in services layers 1108 (e.g., control services 1114-RX and 1114-TX, interrupt services 1118-RX and 1118-TX, etc.) may be implemented as control services using a second quality-of-service configured to guarantee error-free data transfer by tolerating added data latency from data retransmission when data transmission errors are detected. Each of these data services will now be described to provide more specific detail about the types of data that they may be responsible for, the quality-of-service that they may require to function properly, and how they may interoperate to achieve the overall hearing system operations and functions that have been described. It will be understood that the illustrated data services are provided by way of illustration and that fewer or additional services not explicitly shown and described may be included in certain implementations.

Clocking services 1112 may create a timing logical channel configured for the purpose of data link operation and information rate flow adjustments at either endpoint. For example, clocking services 1112 may facilitate collecting information about local clocking capabilities of both endpoints (e.g., the hearing device and the accessory), reconstructing or facilitating reconstruction of a clock signal integrated in self-clocked data within data frames 110, determining characteristics of the hearing device or accessory reference clocks, detecting a stimulation data consumption rate for an accessory such as a cochlear implant, or the like. Timing information transmitted from the hearing device to the accessory may be embedded within the data link and/or physical layer to allow for the operation of the data link itself. The principal endpoint, which provides this timing information (e.g., typically the hearing device, though it could be the accessory in certain implementations), may be referred to as the timing master. As shown, clocking services 1112 may interoperate with bridge functions 1110-1 to reconstruct a clock from received clocking fields of data frames 110 and to provide a clock to data link layer 1104-A.

Timing information received and processed by clocking services 1112 may be used to perform sample rate conversion or actual sample collection at the specified rate of an audio signal (e.g., the rate of an active headpiece microphone). For certain hearing device applications (e.g., cochlear implant speech processing and implant communications, etc.) a telemetry frequency may be used that may or may not be the same as that of the reconstructed data link clock frequency. In certain cases, the telemetry frequency may be derived from the data link clock frequency (e.g., the same frequency, a multiple of the frequency, etc.). In other cases, the telemetry frequency need not be derivative of the data link clock frequency and could have its own independent time drifts (e.g., the communication interface clock frequency and the implant communication data link may operate at different and asynchronous clock frequencies). In either case, the logical channel created by clocking services 1112 may communicate the implant stimulation frame rate to the hearing device as needed.

Clocking services 1112 may also include or be associated with more general data services associated with configuring the different qualities-of-service implemented by the data link for the different services. By communicating certain attributes associated with desirable qualities-of-service, for instance, better operational efficiency may be achieved for the communication interface. For instance, a service-specific quality configuration service may handle parameters such as how many clock transitions to transmit, how many expected clock symbols can go missing, methods of measuring/computing digital phase locked loop frame duration input, a number of retransmissions that are allowed or can be requested for signaling fields, a specification of the CRC method to be used for signaling fields and/or control data (in cases of non-real-time applications), specification of interleaving depth, FEC and CRC methods to be employed for real-time applications, quality of the clock recovered, a statistical view of errors/retransmission, and so forth. These and/or other parameters may provide a way to select optimized parameters to improve data link operations, data logging, or the like.

Control services 1114-RX may be configured to receive and process incoming control data (from the other endpoint), and may interoperate with control services 1114-TX, which may be configured to transmit control data to be used by the other endpoint. Collectively, control services 1114-RX and 1114-TX may be responsible for any control or overhead functions as may need to be addressed by a given application. For instance, in the example of a cochlear implant system such as cochlear implant system 400, control services 1114 (i.e. control services 1114-RX and 1114-TX collectively) may be configured to provide or facilitate (e.g., transmit, receive, etc.) communications such as the following: 1) transmission of headpiece control parameters from a sound processor implementing the hearing device to an active headpiece implementing the accessory, 2) transmission of headpiece status data from the active headpiece to the sound processor, 3) transmission of recipient parameters from the active headpiece to the sound processor (where the recipient parameters stored within a cochlear implant inductively coupled to the active headpiece and implanted within the recipient), 4) transmission of program code from the sound processor to the active headpiece or to the cochlear implant, and/or 5) any other such control data as may be communicated by way of communication interface 106.

As has been mentioned, control services 1114 may operate using a control quality-of-service configured for services that can accept delayed delivery of data (to a certain degree based on the service) but cannot accept errors in the data due to unintended consequences that could be brought about. Further examples of such data services that may be implemented by control services 1114 include: accessory configuration, control data read and writes (e.g., to various components within the hearing device or accessory including an analog-to-digital converter (ADC), a digital-to-analog converter (DAC), a forward or back telemetry receiver, etc.), accessory (e.g., active headpiece or cochlear implant) CPU or DSP code memory, data memory downloads and messages in the accessory, reading information from the active headpiece (or its CPU) with respect to status or measurements that have been taken (e.g., by the cochlear implant), information read from the cochlear implant (containing, for example, objective measurements, patient parameters stored within the implant, etc.), or other data services as may serve a particular implementation of a cochlear implant system, hearing aid system, or other suitable hearing system.

Real-time services 1116-RX may be configured to receive and process incoming real-time data (from the other endpoint), and may interoperate with real-time services 1116-TX, which may be configured to transmit real-time data to be used by the other endpoint. Collectively, real-time services 1116-RX and 1116-TX may be responsible for any real-time functions as may need to be performed by a given application. For instance, in the example of a cochlear implant system such as cochlear implant system 400, real-time services 1116 (i.e. real-time services 1116-RX and 1116-TX collectively) may be configured to provide or facilitate (e.g., transmit, receive, etc.) communications such as the following: 1) transmission of forward telemetry data from a sound processor implementing the hearing device to an active headpiece implementing the accessory, 2) transmission of implant power control parameters from the sound processor to the active headpiece (e.g., wherein the implant power control parameters may relate to power provided by the active headpiece to a cochlear implant inductively coupled to the active headpiece and implanted within the recipient), 3) transmission of audio data from the active headpiece to the sound processor (e.g., wherein the audio data may be captured by a microphone associated with the active headpiece), 4) transmission of cochlear implant data from the active headpiece to the sound processor (e.g., wherein the cochlear implant data is generated by, or indicative of a status of, the cochlear implant and may include, for instance, audio data acquired by a microphone of the implant, neural recording data such as evoked compound action potentials (ECAP) or other such evoked potentials or cochlea-microphonic signals responsive to acoustic stimuli, etc.), and/or 5) any other such real-time data as may be communicated by way of communication interface 106.

As has been mentioned, real-time services 1116 may operate using a real-time quality-of-service configured for data streams that are continuous in nature. For example, certain hearing systems may continuously process ambient sounds that occur continuously in the recipient's environment (e.g., to provide information to generate proper implant electrode stimulus current, as described above). This type of information is real time in nature and cannot tolerate excessive delay with problems being created (e.g., lip-synchronization issues, etc.). Data services using a real-time quality-of-service such as this may generally avoid data retransmission requests, since data retransmission delay can be long enough to present issues, and can be unpredictable. As has been mentioned, real-time data services such as real-time services 1116 may still employ methods such as forward error correction (FEC), and cyclic redundancy check (CRC). However, rather than requesting retransmission when a problem is detected, real-time services 1116 may use these protocols to correct errors without data retransmission (FEC) or, if that is not possible and the errors are significant enough, to determine whether to apply packet loss concealment algorithms (if any) and/or to terminate (and possibly restart) the service.

Interrupt services 1118-RX may be configured to receive and process incoming interrupt data (from the other endpoint), and may interoperate with interrupt services 1118-TX, which may be configured to transmit interrupt data to be used by the other endpoint. Collectively, interrupt services 1118-RX and 1118-TX may be responsible for any interrupt-related functions as may need to be performed by a given application. For instance, in situations where either the hearing device or the accessory may have information about a sporadic event that is to be shared with the other endpoint and is extremely time sensitive, interrupt services 1118 may be used to communicate what has occurred, what action needs to be taken, etc., using the interrupt field described above. For instance, in the example of a cochlear implant system such as cochlear implant system 400, interrupt services 1118 (i.e. interrupt services 1118-RX and 1118-TX collectively) may be configured to provide or facilitate (e.g., transmit, receive, etc.) communications such as the following. Interrupts from an accessory such as an active headpiece to a hearing device such as a sound processor may indicate, for example: 1) a requested measurement (e.g., a supply voltage measurement of the active headpiece, a measurement of another parameter, etc.) is complete, 2) information requested from the cochlear implant has been read and is available at the active headpiece, 3) a particular type of error has been detected at the active headpiece (e.g., supply voltage variations beyond threshold, data errors that cannot be handled, CPU unexpected watchdog for firmware crash errors, etc.), and/or 4) any other timely information as may serve a particular implementation. Conversely, interrupts from the hearing device to the accessory may indicate, for example: 1) a request to perform a certain measurement (e.g., indicating a trigger for a measurement such as a supply voltage, a received signal strength detected at the cochlear implant, etc.), 2) a request to transmit the collected (or queued) data in the active headpiece (in cases where the active headpiece serves as an aggregator of data from various sources until it is requested to transmit to the sound processor), and/or 3) any other timely information as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

a hearing device configured to be worn by a recipient;

an accessory configured to interoperate with the hearing device while worn by the recipient at a separate location from the hearing device; and a communication interface between the hearing device and the accessory, the communication interface including two physical conductors configured to carry differential signaling generated in accordance with a frame protocol;

wherein the frame protocol defines a data frame configured to communicate a first dataset and a second dataset, the first dataset associated with a first data service performed in accordance with a first quality-of-service and the second dataset associated with a second data service performed in accordance with a second quality-of-service different from and incompatible with the first quality-of-service.

2. The system of claim 1, implemented as a cochlear implant system in which:

the hearing device is implemented by a sound processor; and the accessory is implemented by an active headpiece that is communicatively coupled to the sound processor by way of the communication interface and is inductively coupled to a cochlear implant that is implanted within the recipient.

3. The system of claim 1, wherein:

the first data service is a real-time service and the first quality-of-service is configured to guarantee a particular data latency by tolerating data transmission errors and forgoing data retransmission when data transmission errors are detected; and the second data service is a control service and the second quality-of-service is configured to guarantee error-free data transfer by tolerating added data latency from data retransmission when data transmission errors are detected.

4. The system of claim 3, wherein the real-time service is configured to provide at least one of:

transmission of forward telemetry data from a sound processor implementing the hearing device to an active headpiece implementing the accessory;

transmission of implant power control parameters from the sound processor to the active headpiece, the implant power control parameters relating to power provided by the active headpiece to a cochlear implant inductively coupled to the active headpiece and implanted within the recipient;

transmission of audio data from the active headpiece to the sound processor, the audio data captured by a microphone associated with the active headpiece; or transmission of cochlear implant data from the active headpiece to the sound processor, the cochlear implant data generated by, or indicative of a status of, the cochlear implant.

5. The system of claim 3, wherein the control service is configured to provide at least one of:

transmission of headpiece control parameters from a sound processor implementing the hearing device to an active headpiece implementing the accessory;

transmission of headpiece status data from the active headpiece to the sound processor;

transmission of recipient parameters from the active headpiece to the sound processor, the recipient parameters stored within a cochlear implant inductively coupled to the active headpiece and implanted within the recipient; or transmission of program code from the sound processor to the active headpiece or to the cochlear implant.

6. The system of claim 1, implemented as a hearing aid system in which:

the hearing device is implemented by a hearing aid; and the accessory is implemented by a sensor, an audio source, or an audio sink that is communicatively coupled to the hearing aid by way of the communication interface.

7. The system of claim 1, wherein the accessory is implemented by a sensor including at least one of:

an accelerometer;

a blood-oxygen level sensor;

a body temperature sensor;

a heart rate sensor; or a blood volume change sensor.

8. The system of claim 1, wherein:

the frame protocol further defines the data frame to communicate a third dataset associated with a third data service performed in accordance with the second quality-of-service; and the data frame defined by the frame protocol is configured to support a mid-frame change of data transmission direction such that:

the second dataset is transmitted in a direction from the hearing device to the accessory, and the third dataset is transmitted in an opposite direction from the accessory to the hearing device.

9. The system of claim 1, wherein, to support a mid-frame change of data transmission direction:

the data frame includes:

a first signaling field in which a principal endpoint communicates transmission status information for the principal endpoint, and a second signaling field in which an agent endpoint communicates transmission status information for the agent endpoint; and the frame protocol defines a set of arbitration rules configured to resolve a transmission conflict introduced by the transmission status information for the principal endpoint and the transmission status information for the agent endpoint.

10. The system of claim 1, wherein:

the frame protocol defines the data frame to include a plurality of direction-configurable fields including a first field for communicating the first dataset and a second field for communicating the second dataset; and prior to each direction-configurable field in the plurality of direction-configurable fields included in the data frame, the frame protocol defines a guard time configured to facilitate a mid-frame change of data transmission direction and during which no data is communicated.

11. The system of claim 10, wherein, during each guard time in which a mid-frame change of data transmission direction occurs such that a prior transmitting endpoint becomes a present receiving endpoint and a prior receiving endpoint becomes a present transmitting endpoint:

the present transmitting endpoint removes a first termination resistance from a transmission circuit of the present transmitting endpoint; and the present receiving endpoint applies a second termination resistance to a receiving circuit of the present receiving endpoint.

12. The system of claim 1, wherein the frame protocol defines the data frame to include a direction-configurable interrupt field in which an interrupt dataset associated with an interrupt data service is communicated in accordance with a quality-of-service configured to guarantee error-free data transfer by tolerating added data latency from data retransmission when data transmission errors are detected.

13. The system of claim 1, wherein the frame protocol defines the data frame to include, prior to fields in which the first and second datasets are communicated, a clock regeneration field in which a principal endpoint transmits a preestablished data pattern to an agent endpoint to allow the agent endpoint to reconstruct a clock of the principal endpoint.

14. The system of claim 1, wherein the frame protocol is configured such that a high-level dataset associated with a high-level data protocol can be communicated across a plurality of the data frames defined by the frame protocol.

15. A communication interface between a hearing device and an accessory worn by a recipient at separate locations on the recipient, the communication interface comprising:

two physical conductors configured to carry differential signaling generated in accordance with a frame protocol;

wherein the frame protocol defines a data frame configured to communicate a first dataset and a second dataset, the first dataset associated with a first data service performed in accordance with a first quality-of-service and the second dataset associated with a second data service performed in accordance with a second quality-of-service different from and incompatible with the first quality-of-service.

16. The communication interface of claim 15, wherein the communication interface is implemented within a cochlear implant system that includes:

a cochlear implant that is implanted within the recipient;

a sound processor implementing the hearing device; and an active headpiece implementing the accessory, the active headpiece communicatively coupled to the sound processor by way of the communication interface and inductively coupled to the cochlear implant within the recipient.

17. The communication interface of claim 15, wherein the communication interface is implemented within a hearing aid system that includes:

a hearing aid implementing the hearing device; and a sensor, an audio source, or an audio sink implementing the accessory and communicatively coupled to the hearing aid by way of the communication interface.

18. A method comprising:

communicating a first dataset and a second dataset between a hearing device worn by a recipient and an accessory interoperating with the hearing device while worn by the recipient at a separate location from the hearing device;

wherein the communicating of the first and second datasets is performed:

by way of a communication interface between the hearing device and the accessory, the communication interface including two physical conductors configured to carry differential signaling generated in accordance with a frame protocol, and as part of a data frame defined by the frame protocol, the data frame defined such that the first dataset is associated with a first data service performed in accordance with a first quality-of-service and the second dataset is associated with a second data service performed in accordance with a second quality-of-service different from and incompatible with the first quality-of-service.

19. The method of claim 18, wherein the communicating is performed by a cochlear implant system that includes:

a cochlear implant that is implanted within the recipient;

a sound processor implementing the hearing device; and an active headpiece implementing the accessory, the active headpiece communicatively coupled to the sound processor by way of the communication interface and inductively coupled to the cochlear implant within the recipient.

20. The method of claim 18, wherein the communicating is performed by a hearing aid system that includes:

a hearing aid implementing the hearing device; and a sensor, and audio source, or an audio sink implementing the accessory and communicatively coupled to the hearing aid by way of the communication interface.

* * * * *